United States Patent
Monta et al.

(10) Patent No.: US 7,039,048 B1
(45) Date of Patent: May 2, 2006

(54) HEADEND CHERRYPICKER MULTIPLEXER WITH SWITCHED FRONT END

(75) Inventors: Peter Albert Monta, Palo Alto, CA (US); Selim Shlomo Rakib, Cupertino, CA (US); Edward Anthony Krause, San Mateo, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 874 days.

(21) Appl. No.: 09/667,892

(22) Filed: Sep. 22, 2000

(51) Int. Cl.
*H04L 12/28* (2006.01)

(52) U.S. Cl. .................. 370/389; 370/473; 725/138

(58) Field of Classification Search .............. 370/392, 370/468, 908, 389, 390, 401, 465, 532; 709/218, 709/219; 725/87, 95
See application file for complete search history.

(56) References Cited

U.S. PATENT DOCUMENTS

| | | | | |
|---|---|---|---|---|
| 5,861,881 A | * | 1/1999 | Freeman et al. | 715/500.1 |
| 6,049,823 A | * | 4/2000 | Hwang | 725/82 |
| 6,160,797 A | * | 12/2000 | Robert et al. | 370/316 |
| 6,446,262 B1 | * | 9/2002 | Malaure et al. | 725/141 |
| 6,477,179 B1 | * | 11/2002 | Fujii et al. | 370/466 |
| 6,487,182 B1 | * | 11/2002 | Kitazato | 370/315 |
| 6,543,053 B1 | * | 4/2003 | Li et al. | 725/88 |
| 6,594,826 B1 | * | 7/2003 | Rao et al. | 725/95 |
| 6,772,433 B1 | * | 8/2004 | LaJoie et al. | 725/52 |
| 6,798,751 B1 | * | 9/2004 | Voit et al. | 370/252 |
| 6,831,892 B1 | * | 12/2004 | Robinett et al. | 370/232 |
| 6,832,323 B1 | * | 12/2004 | Booth et al. | 713/201 |
| 2001/0003846 A1 | * | 6/2001 | Rowe et al. | 725/47 |
| 2003/0101459 A1 | * | 5/2003 | Edson | 725/82 |

* cited by examiner

*Primary Examiner*—Steven Nguyen
*Assistant Examiner*—Clemence Ham
(74) *Attorney, Agent, or Firm*—Thelen Reid & Priest LLP

(57) ABSTRACT

A headend or central office or satellite uplink facility for receiving upstream video-on-demand requests and MPEG transport streams containing video program data and packetizing said video data into TCP/IP or UDP/IP packets and LAN packets and routing them through a switch to one or more cherrypicker multiplexers. Each cherrypicker multiplexer receives LAN packets, depacketizes the MPEG data, partially or fully decompresses the data and recompresses the data to another smaller bandwidth, and repacketizes the data into MPEG packets or TCP/IP or UDP/IP packets. The repacketized TCP/IP or UDP/IP packets are transmitted directly to the customer as TCP/IP or UDP/IP packet data. MPEG packets generated by the cherrypicker multiplexer are, optionally, encapsulated in LAN packets addressed to an IP dewrapper circuit. There, they are depacketized back to MPEG packets and transmitted to the appropriate transmitter or modem for transmitting to a customer. Internet data and data from application servers, referred to as iData, can also be transmitted to customers through the cherrypicker multiplexers or a downstream modem, and upstream iData can be received through the modem.

42 Claims, 10 Drawing Sheets

HEADEND CHERRYPICKER MULTIPLEXER WITH SWITCHED FRONT END

BACKGROUND OF THE INVENTION

Broadband video-on-demand services and broadband internet access are gaining in popularity continuously. Broadband video and data services are currently being delivered by cable TV systems, satellite and asynchronous digital subscriber line services over regular telephone pairs. Digital cable TV data delivery systems come in the broadcast variety and the switched cable variety.

One thing that all these broadband digital data delivery systems have in common is the use of "cherrypicker multiplexers" at the headend to receive digital video data as MPEG transport streams. The cherrypickers function to cull out the MPEG packets of only the desired programs and assemble them as output MPEG transport streams.

Cherrypickers are currently in use in digital broadband cable TV data delivery systems. An example of this type cherrypicker are the headend multiplexers sold commercially by Terayon Communications Systems, Inc. of Santa Clara, Calif. In the broadcast digital cable configuration, a plurality of headend cherrypicker multiplexers receive a plurality of digital MPEG compressed video data transport streams through a plurality of splitters. The inputs of the splitters are MPEG transport data streams from satellite downlinks or video servers. The outputs of the splitters have to be hardwired to the inputs of a plurality of cherrypicker switches that do the job of culling out the desired MPEG packets. This creates a rat's nest of point-to-point connections which have to be manually wired and, when a change occurs, have to be manually re-wired.

An MPEG transport stream is a river of compressed data from which it is impossible to remove only the desired packets unless the transport stream is first decompressed. The cherry picker switches do the culling process by taking the compressed MPEG transport stream and decompressing them almost back to their original resolution. Then the cherrypicker switches cull out the MPEG packets of the desired programs using program identifier codes (hereafter PIDs). Each MPEG transport stream is comprised of a plurality of different video programs or video and audio programs that go together called "multiplexes". Each video program has a PID, and each multiplex has a PID. The cherrypicker switches use these PIDs to pick out the desired programs from the MPEG transport streams.

These culled packets selected by each cherrypicker are then recompressed, usually to a different bandwidth that matches the available bandwidth of the digital transmission medium on which the data is to be transmitted to the customers. The recompressed MPEG packets culled by each cherrypicker are then re-assembled into an output MPEG transport stream and sent to whatever circuitry is used to transmit it downstream. That might be a modulator that modulates it onto a specific carrier frequency for frequency division multiplexing of multiple logical channels onto the same downstream or it may be a DSL modem.

The rat's nest of point-to-point connections in this prior art cherrypicker design is expensive and inflexible because of the need for hand slinging and re-slinging of wires to set it up or change it. Further, it is not well suited to adaptation to the delivery of internet protocol packets (hereafter IP packets) from a web server or DSL line or T-carrier telephony packets from a T-carrier interface.

In addition, current cherrypickers made by Terayon do not have the ability to receive upstream requests for video-on-demand (hereafter VOD) selections or internet services or the ability to fulfill those requests.

Accordingly, a need has arisen for a cherrypicker that can receive MPEG transport stream and IP packet streams with equal ease and get them to all the cherrypicker switches that need them without a complicated set of point-to-point connections that need to be wired by hand. In addition, because the possible applications for the improved cherrypicker includes DSL systems where there may be thousands of cherrypickers, one for each DSL line, there is a need for the improved cherrypicker design to be inexpensive to build. An additional need has arisen for a cherrypicker which can receive upstream requests for video-on-demand selections and internet services and fulfill those requests by picking out the desired MPEG packets and IP packets from input streams and putting them together into output streams.

SUMMARY OF THE INVENTION

The advantages of the packet switched cherrypicker architecture are several. First, it is transparent to all users since they still see the same MPEG transport stream in and MPEG transport stream out interfaces as existed in the prior art cherrypickers. Second, the replacement of the hardwired connections with a packet switched network allows all sources to be available to all clients and system control is simpler and more extensible. Further, the system is lower cost to build and maintain and consumes 10 times less rack space. Finally, the system can be easily scaled up or down in size and it is compatible with new markets for broadband delivery of digital data in IP packet format.

DETAILED DESCRIPTION OF THE PREFERRED AND ALTERNATIVE EMBODIMENTS

"Video program data" as that term is used herein and in the claims includes not only the video data of a broadcasted or video-on-demand program but also one or more audio tracks of data, if they exist, and any auxiliary graphic or text data that is to be displayed during the program. "PID" as that term is used in the claim means not only the PID of an MPEG packet but also its input wire or multiplex number as well if there is more than one input wire inputting MPEG transport streams which may have duplicate PIDs to the network cherrypicker.

Figure 1:
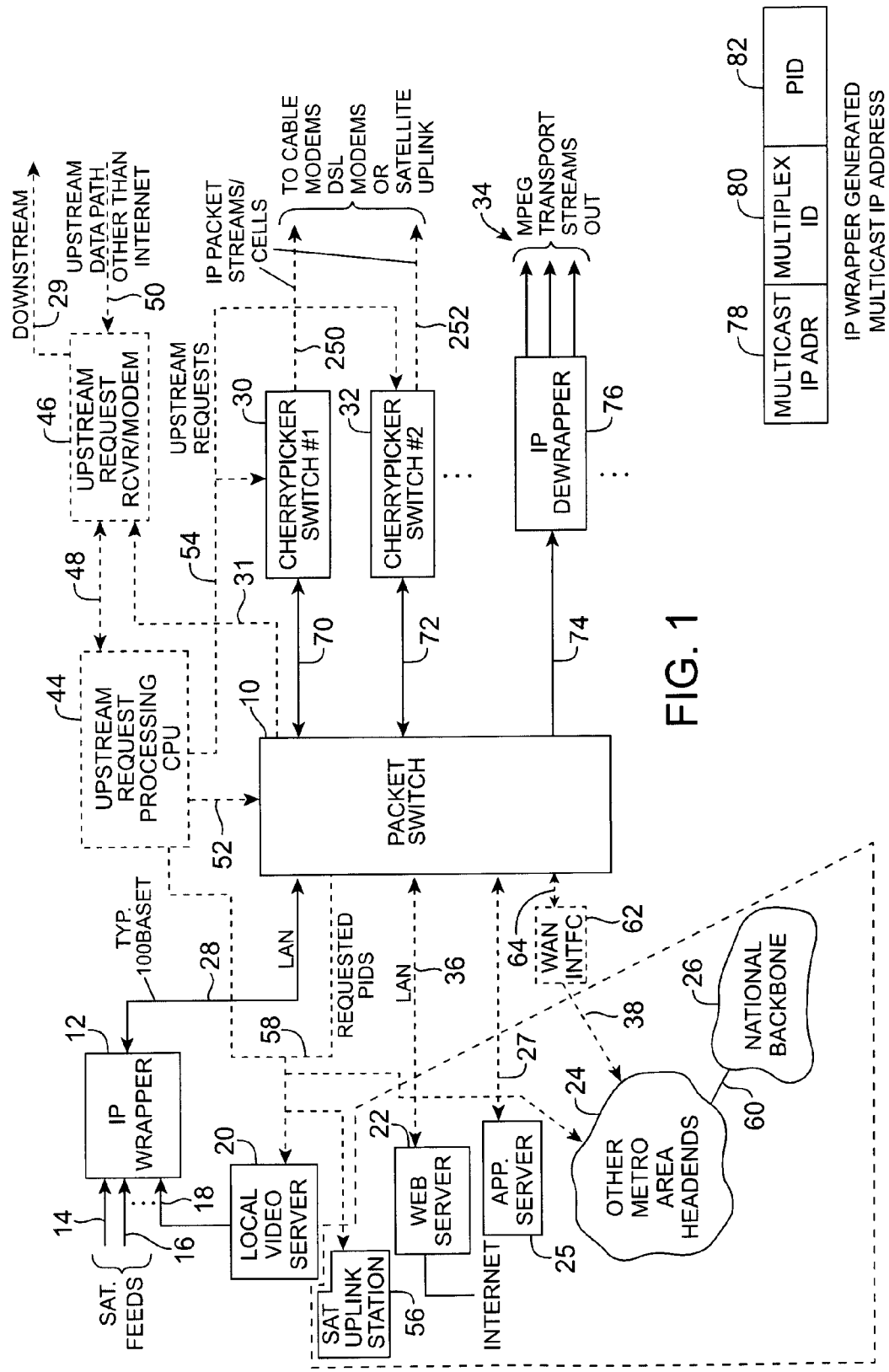
FIG. 1 is a block diagram of an improved cherrypicker according to the genus of the invention which uses a network switch and IP wrapper technology on the front end to replace the handwired splitter network.

Referring to FIG. 1, there is shown a block of an improved cherrypicker according to the genus of the invention which uses a network switch and IP wrapper technology on the front end to replace the handwired splitter network. The front end circuitry of the improved cherrypicket that gets input data to the cherrypicker switches is comprised of an packet switch 10 and an IP wrapper circuit 12. The IP wrapper circuit receives multiple compressed video MPEG transport streams on input lines 14, 16 and 18. Input lines 14 and 16 are shown as receiving MPEG video streams from satellite feeds (satellite downlink receiver circuitry not shown). Input line 18 is shown as receiving an input MPEG transport stream from a local video server 20. The video servers can be any conventional video server. There can be an arbitrary number of satellite feeds and video servers.

The backend of the cherrypicker is comprised of a plurality of cherrypicker switches 30 and 32 and an IP dewrapper circuit 76. The cherrypicker switches function, inter alia, to send Ethernet packets to the packet switch 10 telling it which MPEG packets each wants defined in terms of Ethernet station addresses. Packet switch 10 functions to receive the packets from each cherrypicker switch 30 and 32 designating which Ethernet station addresses it wants sent to it, and to then set up a data path and routing table or other routing circuitry in the switch 10 to route packets with the designated Ethernet stations addresses out on the proper LAN segment to the cherrypicker switch that requested them. Only the packets that have been requested are sent to the cherrypicker switches as opposed to the prior art structure with splitters where each cherrypicker switch received MPEG stream packets from the splitters that had to be rejected. This is one fact that improves the performance and scalability of the system because less processing time is wasted in the cherrypicker rejecting packets that will not be incorporated into the MPEG transport streams each cherrypicker switch is generating.

The cherrypicker switches have front end processing circuitry and software that the prior art cherrypicker multiplexers did not have to be able to receive LAN packets encapsulating TCP/IP packets. That circuitry is shown at 154 in FIG. 8. The cherrypicker multiplexers also recognize the LAN addresses and TCP/IP addresses and use that information generated from the PIDs to sort the incoming packets into one or more MPEG transport streams going to video-on-demand and/or customers who have requested internet data or other data from application server 25. The cherrypicker multiplexers also optionally recode at least the VOD and/or other video program data to the proper bandwidth for the downstream available bandwidth and repacketize into MPEG packets. In some embodiments, the cherrypicker multiplexers packetize the MPEG packets into UDP/IP packets and Ethernet packets addressed to the IP dewrapper 76 and send them to the packet switch 10 which routes them to IP dewrapper 76 which strips off the LAN and UDP/IP packet headers and reassembles each MPEG transport stream and outputs it to the proper transmitter or modem. In other embodiments, such as that shown in FIGS. 11 and 12, each cherrypicker multiplexer outputs one or more MPEG transport streams directly to its own transmitter(s) or modem(s).

The factors that leads to greater scalability include the ability of the cherrypicker switches to receive only the packets they request and to receive LAN packets from any conventional switch via one LAN connection as opposed to multiple inputs from multiple splitters as in the prior art. The prior art was limited by the physical number of inputs each cherrypicker switch had and the processing power of its process. This LAN based front end allows greater scalability by allowing independent selection of packet switch 10 to have the number of outputs and throughput needed for the number of cherrypicker switches being served. In addition, greater scalability is provided by putting the splicing process 168 described in FIG. 8 with the packet scheduling process 168 instead of having the splicing process in front of the recoding farm with a high speed link to the scheduling process on the lower bandwidth side. By doing both the splicing and scheduling processes on the lower bandwidth side of the recoding farm 156, both processes can work at the lower bandwidth rate after recoding.

The packet switch 10 is also shown as receiving TCP/IP internet protocol packet stream inputs from optional sources such as web server 22 and/or other headend circuitry 24 in the metropolitan area where the cherrypicker of FIG. 1 is located. Those other headends may also be coupled to a headends network that is nationwide via a national backbone represented by cloud 26. For example, in the future it may be that Time Warner builds a national landline or satellite based video network to distribute requested video to any Time Warner affiliate cable TV headend or DSL central office. Likewise, citywide distribution of video-on-demand selection may occur over a citywide video network coupling multiple cable headends and DSL central offices. TCP/IP packets from web server 22 may include web pages, e-mail, voice over IP, distance learning, videoconference data, webcasts, streaming video, streaming audio or any of the other types of data that are transmitted over the internet. The data from the web server 22 and the other headends encapsulated in TCP/IP or UDP/IP packets which are themselves encapsulated in LAN packets for transmission over LAN segment 36 or WAN segment 38 and LAN segment 64 will generally be referred to herein and in the claims as iData to distinguish it from video program data from the IP wrapper circuit 12 even though the packets from the other headends 24 may encapsulate video or VOD programs and the iData from the web server may be streaming video.

The packet switch 10 may also be coupled to an application server 25 by a LAN connection 27. The application server is programmed with one or more application programs which can be executed and used remotely by customers from computers or dumb terminals at the customer location. The application server can run games, group games, chat room and banking applications, security systems to display at the headend pictures from cameras at the customer location, advertising, etc. Customers send upstream commands to launch specific applications or menu commands or joystick or other game type input commands to cause the application to respond in a desired way. In response, the application server outputs on LAN segment 27 Ethernet or other LAN packets which encapsulate TCP/IP or UDP/IP packets encapsulating display data for the desktop and each application window or game that is in execution. These packets are either addressed to specific cherrypicker switches serving the customer that is running a particular application or are multicast so that each cherrypicker switch may have access to them. This data will also be referred to as iData in the claims to distinguish it from data transmitted from IP wrapper circuit 12.

The function of the IP wrapper circuit 12 is to break the MPEG transport streams on input lines 14, 16 and 18 up into individual MPEG packets and encapsulate these MPEG packets in multicast IP packets. These IP packets are themselves then encapsulated by the IP wrapper circuit into Ethernet packets addressed to an Ethernet station address that corresponds to the PID. Every audio, video or IP data packet source can have its own unique Ethernet station address. In alternative embodiments, every MPEG transport stream multiplex has its own unique Ethernet station address. Each such multiplex would carry MPEG packets from a plurality of programs, each program having its own unique PID.

In alternative embodiments, other types of packet switch 10 may be used in which case the IP wrapper circuit wraps the IP packet into whatever type LAN packet the switch 10 is capable of processing. The IP wrapper circuit, after doing this encapsulation process, then outputs the Ethernet packets via a network interface circuit (not separately shown) onto a local area network (hereafter LAN) represented by LAN 28 to which switch 10 is also coupled. Typically, the LAN segment 28 is an Ethernet 100BaseT LAN segment, but any other high speed LAN could also be used which has sufficient bandwidth to handle the traffic volume. Examples of other LAN types that can be used are the 100Base-TX standard that uses Category 5 high quality unshielded twisted pair medium and shielded twisted pair medium and the and 100Base-FX standard that used optical fiber for the medium and the 100Base-T4 IEEE 802.3 standard that uses Category 3 or Category 5 cabling. ATM LANS and Gigabit Ethernet LAN segments are also possible.

Ethernet is preferred because Ethernet packet switches to use for packet switch 10 are plentiful and cheap thereby enabling replacement of the prior art bundle of point-to-point connections that had to be manually made and altered with a single Ethernet switch and LAN configuration. Those skilled in the art will appreciate that switching hubs of either the store and forward or the cut-through variety as well as an ATM switch or gateway may also be substituted for packet switch 10.

In the preferred embodiment, the IP wrapper circuit 12 is a field programmable gate array but it could be an ASIC, glue logic or even a programmed microprocessor if one could be found which is fast enough to work at video rates of the MPEG transport streams.

Figure 3:
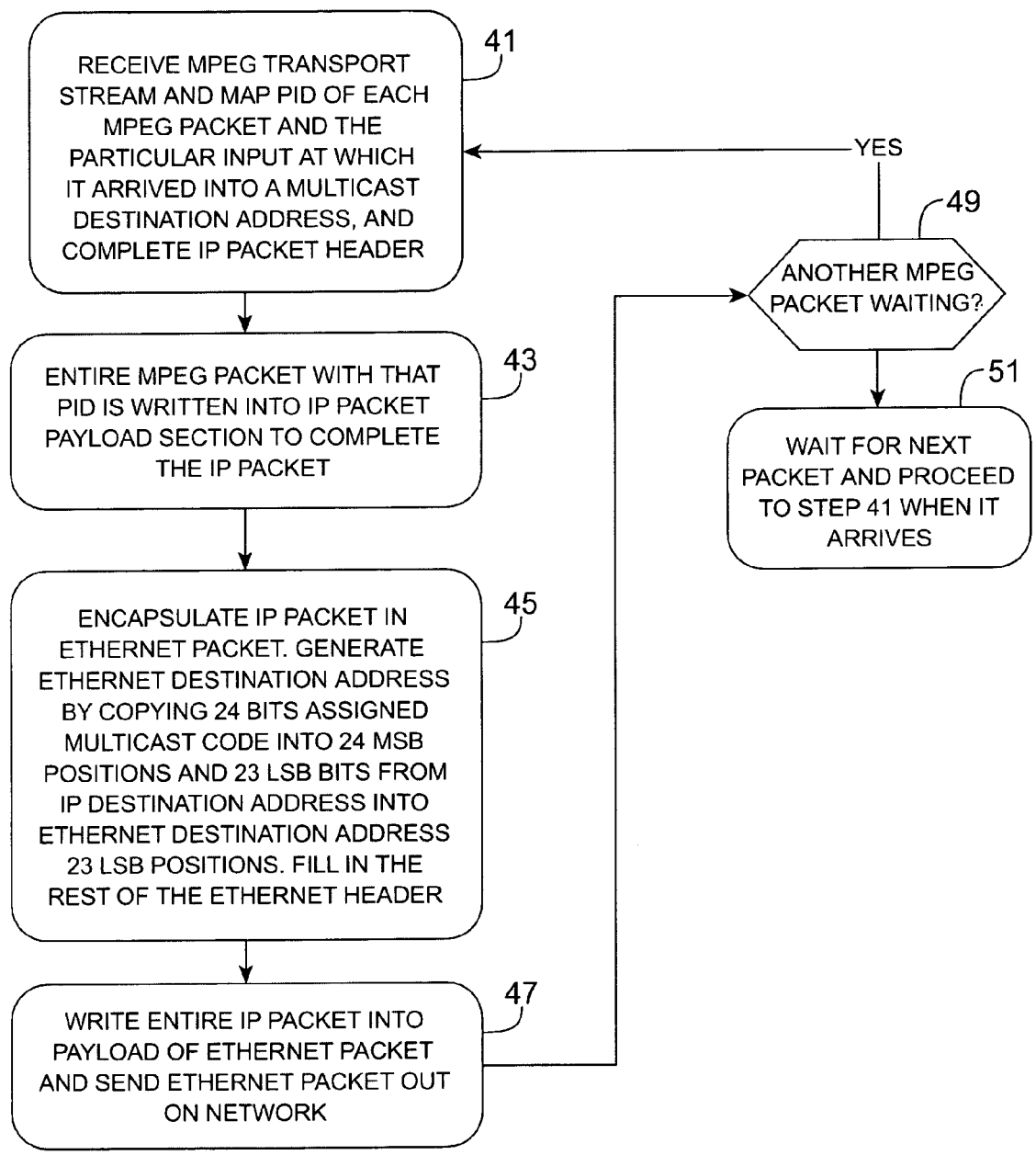
FIG. 3 is a flowchart of one embodiment of the encapsulation process carried out by the IP wrapper circuit 12.

Referring to FIG. 3, there is shown a flowchart of the process carried out by the IP wrapper circuit 12. The first step 41 represents the process of receiving the MPEG transport stream multiplex on each input wire and separating out the MPEG packets and mapping the program identification code (hereafter PID) of each MPEG packet and the number of the particular input wire on which it arrived into a multicast destination address in the header of an IP packet that it being built by the IP wrapper circuit. Any way of constructing a valid IP multicast address from the PID and input multiplex information will suffice to practice the invention. In the claims, the PID and input multiplex number are collectively referred to as the PID at least in claims where the term PID is specifically defined in this way.

Figure 2:
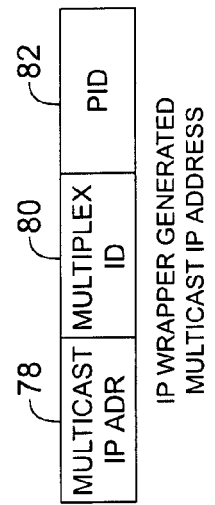
FIG. 2 shows the preferred layout of a typical IP packet multicast address that is generated by the IP wrapper circuit 12 prior to encapsulation into Ethernet packets.

FIG. 2 shows the preferred layout of a typical IP packet multicast address that is generated by the IP wrapper circuit 12 prior to encapsulation into Ethernet packets. Field 78 is a fixed portion of one of the multicast IP addresses that are dedicated to local or experimental use such as 239 in dotted decimal notation. Use of this 239 prefix allows the IP packet to be transmitted to any IP address. Field 80 is the multiplex ID and corresponds to the particular input wire 14, 16, 18 etc. on which enclosed MPEG packet arrived. Field 82 is the PID of the actual MPEG packet data which will be encapsulated in the IP packet's payload section.

There are a large number of IP packet multicast addresses available. Specifically, there are a range of multicast addresses that have been assigned by internet standards bodies for use in IP packet headers, and, within that range, there is a range of addresses reserved for experimental and local use. These local use addresses are used for a certain part of the most significant bit portions of the multicast addresses in the IP packets generated by the IP wrapper circuit 12. In the preferred embodiment, the multicast address that is built from each PID will start with a local code as the first three "dotted decimal" number of the IP address. In other words, each IP address built from a PID will take the form 239.xxx.xxx.xxx. In this format, the 239 is the local ID unique to this headend indicating the IP address is a multicast address in the range of local use IP multicast addresses. The xxx.xxx.xxx portion of each IP address built from a PID arriving at a particular input is the dotted decimal representation of the binary representation of a concatenation of the PID and the number of the input on which the MPEG packet with that PID arrived. That will complete the IP packet destination address. The source address can be anything and is a don't care since neither the cherrypicker switches nor the switch 10 will be sending anything back to the IP wrapper 12. The source address must be filled in with something however in cases where the switch 10 will reject any packet with an improper IP header.

Step 43 represents the process of taking the entire MPEG packet with the PID for which an IP packet header was just constructed and writing it into the payload section of the IP packet to complete the IP packet.

Step 45 represents the step of encapsulating the IP packet into a LAN packet of the type that matches the capabilities of the LAN network interface card of the IP wrapper circuit 12 and the capabilities of the packet switch 10. In the example here, the LAN segment 28 is a 100BaseT Ethernet, but any high speed LAN for which a packet switch that can perform the functions recited herein will suffice. Ethernet is preferred because high speed Ethernet switches to perform the function of packet switch 10 are plentiful and inexpensive and well suited to hold the overall cost of the cherrypicker down for DSL applications. Ethernet packet switches suitable for performing the switching/routing function of packet switch 10 are commerically available from Cisco, D-Link and Foundry. However, in applications other than DSL where the number of cherrypickers is small, the packet switch 10 can be a more exotic variety and the LAN segment 28 can be some other type such as 2 gigabit Fibre Channel Arbitrated Loop (an FCAL switch is known and commercially available from Gadzoox Networks, Inc. of San Jose, Calif.). Even in DSL environments however, in some embodiments, the cherrypicker switches 30 and 32 may each generate multiple MPEG transport streams, each intended for transmission on the downstream channel of one DSL line so as to hold down the number of cherrypicker switches 30 and 32 needed. Typically, each cherrypicker switch 30 and 32 can generate about 8 MPEG transport streams. Each MPEG transport stream can transport about 12 logical video channels (multiplexed digitally by their different PIDs) at video-on-demand quality or about 16–18 logical video channels at VCR quality. Thus, the number of cherrypicker switches needed depends upon the number of DSL lines to be serviced with digital video delivery and the quality of the video channels to be delivered.

Step 45 constructs the Ethernet packet header destination address such that the destination address is an Ethernet station address for each Ethernet packet that is unique to the particular PID of the encapsulated MPEG packet. This is done as follows. First, the 24 most significant bits (hereafter MSB) are written into the Ethernet destination address as a constant which never changes. These 24 bits define the Ethernet destination address as being in the overlap between the IP multicast address space and the Ethernet address space. The IP multicast address space is a block of reserved addresses that have been defined by a standards body that oversees the internet address space. This IP multicast address space has a portion thereof which overlaps a portion of the Ethernet address space which another standards body oversees.

There are thousands of PIDs, and each PID will be mapped to an Ethernet station address which is unique to it. This is done by completing the Ethernet station address by copying the 23 least significant bits (hereafter LSB) of the IP packet destination address into the 23 LSBs of the Ethernet station address. The source address again is a don't care but it needs to be filled in with something the switch 10 will not reject if the switch 10 will reject the packet if it does not have a correct source address.

The final step performed by the IP wrapper circuit 12 is represented by block 47. In this step, the entire IP packet is written into the payload section of the Ethernet packet for which a header was just constructed, and the resulting completed Ethernet packet is transmitted out on the LAN segment 28.

Steps 49 and 51 represent the processing to repeat the process of steps 41 through 47 on the next MPEG packet.

Figure 4A:
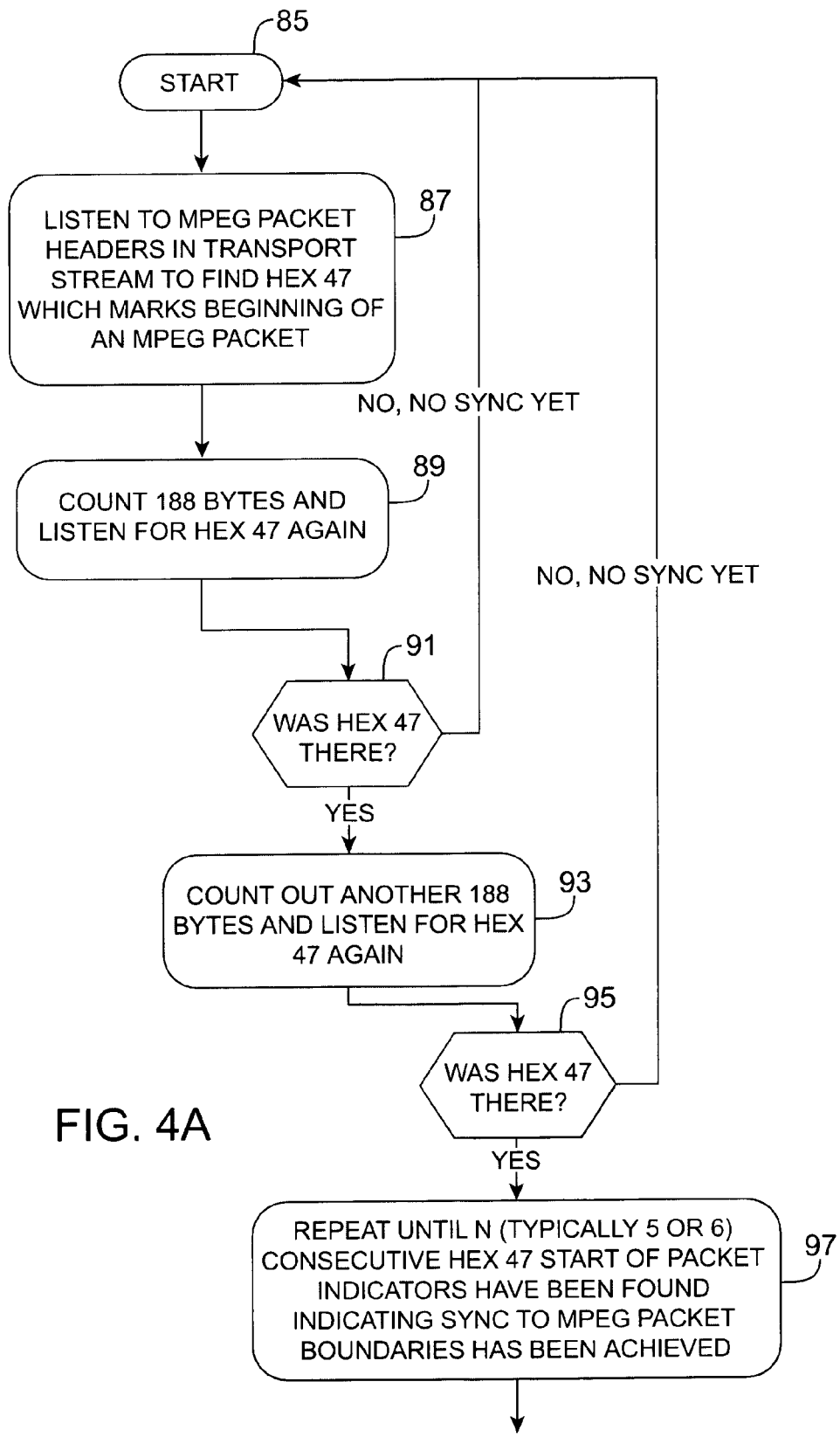
FIGS. 4A and 4B together comprise a flowchart of the preferred process of encapsulating MPEG packets into Ethernet packets carried out by the IP wrapper circuit 12 to gather multiple MPEG packets of the same PID for encapsulation into the same Ethernet packet.
Figure 4B:
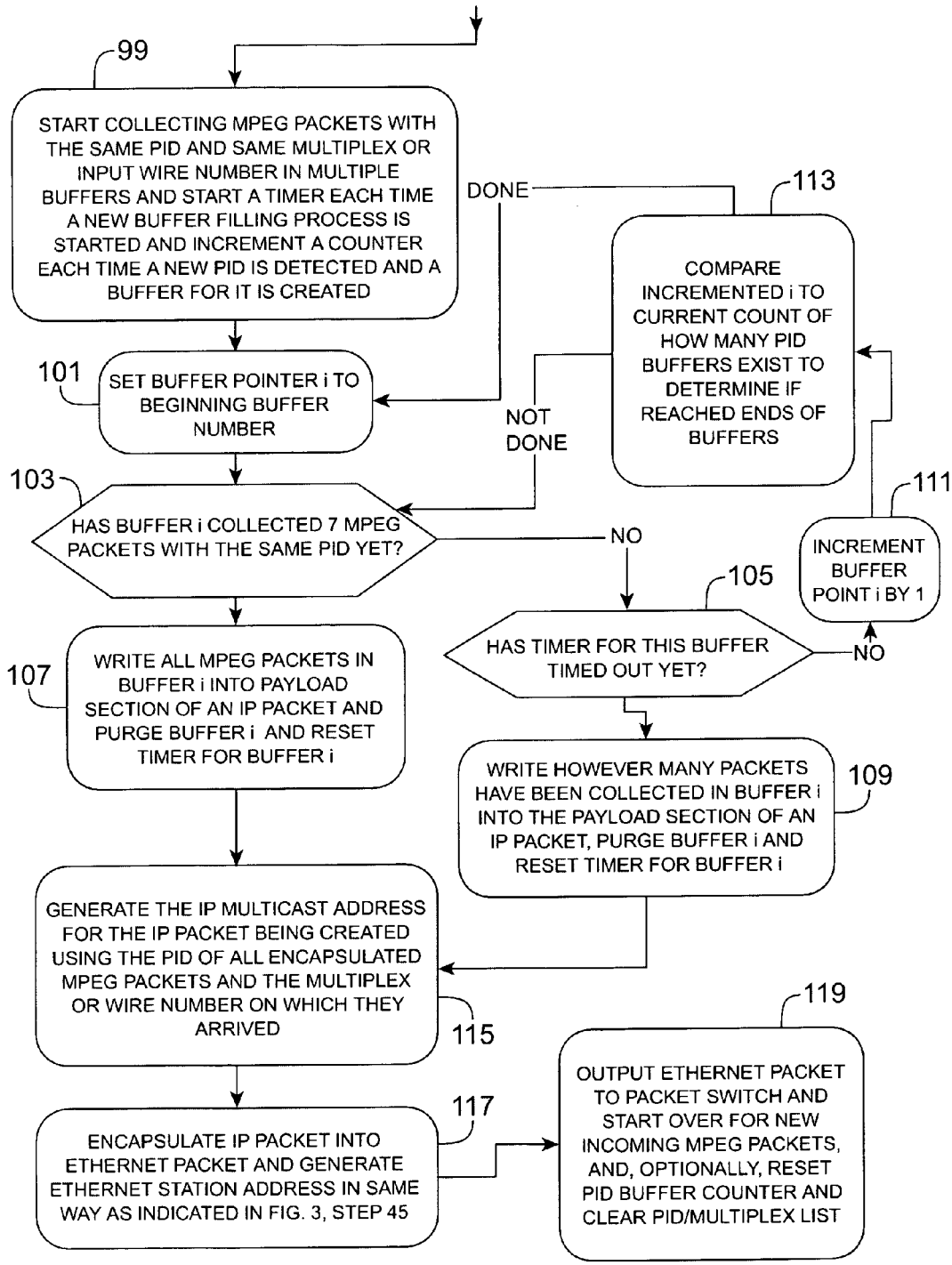

FIGS. 4A and 4B together comprise a flowchart of the preferred process of encapsulating MPEG packets into Ethernet packets carried out by the IP wrapper circuit 12 to gather multiple MPEG packets of the same PID for encapsulation into the same Ethernet packet. This process is preferred because the maximum size for an Ethernet MTU or frame is large enough to encapsulate up to seven MPEG packets. Thus, the process of FIG. 2 which puts one MPEG packet into each Ethernet packet puts strain on the packet switch 10 by generating more packets and wastes bandwidth by using more bits for overhead in headers. The basic function of the process of FIGS. 4A and 4B is to achieve synchronization with the MPEG packet boundaries in each input transport stream to the IP wrapper circuit 12 and then start collecting MPEG packets having the same PID and same multiplex number in buffers and when 7 are collected or a timer times out, writing the collected packets into an IP packet, generating an IP multicast address using the PID and multiplex number and then generate an Ethernet station address using the IP address.

The process starts at step 85 and then proceeds to step 87 to listen to the stream until a hex 47 is found. The first portion of every MPEG packet 4 byte header is hex 47 and serves to mark the beginning of the packet. Each MPEG packet is 188 bytes long. When a hex 47 is found, step 89 is performed to count out the next sequential 188 bytes to the beginning of the next MPEG packet where another hex 47 should be found and listen for it. Test 91 determines if hex 47 occurred where it was supposed to. If not, no synchronization has yet been achieved, and processing returns to step 85. If another hex 47 was found, processing of step 93 counts out another 188 bytes and listens for hex 47 again to mark the beginning of a third sequential packet. Test 95 determines if hex 47 was found by step 93. If not, processing returns to step 85 to start looking for sync again. If so, processing proceeds to step 97 which symbolizes repeating the foregoing process until hex 47 has been found consecutively in N packets where N is typically 5 or 6 packets or any number deemed adequate to give a high level of confidence that synchronization has been achieved.

Next, step 99 is performed to begin collecting MPEG packets in buffers. Specifically, step 99 detects the PID arriving on a particular multiplex or input wire of an incoming packet and compares it to a list of PIDs/input wire pairs for which buffers have already been established. If a buffer already exists for a packet having a particular PID and input wire, then the packet is written into the existing buffer. The reason the input wire the packet arrived on is important is because different input wires or multiplexes may have the same PIDs so the input wire number, i.e., the multiplex number, is what distinguishes these two packets. Step 99 is performed on an ongoing basis as a background process with the processing of steps 101 and following being used to check the buffers and timeout timer and sweep the buffer contents out into IP packets, purge the buffers, reset timers and complete packets etc.

Each time step 99 detects a new PID and input wire combination, it creates a buffer for that packet and a software timer (or dedicates a new hardware timer) for that buffer with a timeout value set at some maximum value to be described below. The packet with the new PID and multiplex number is then stored in the newly created buffer and the timer is started. The reason that each buffer needs a timer is that in the process of collecting MPEG packets in the buffers, they will be taken out of their sequence in the MPEG transport stream. However, because the MPEG transport stream has timestamps in it to allow decoders at the user premises to reassemble the video and audio data packets into the correct sequence and keep them synchronized. The maximum value of the timer for each buffer for timeout must be set at some value which is not so much as to cause loss of sequencing and synchronization in the downstream decoders. This value can be easily determined experimentally by those skilled in the art by simple experimentation. The purpose of the timer is to cause whatever packets of the same PID and multiplex number that have been collected in a buffer to be swept out into an IP packet even if seven MPEG packets have not yet been collected in that buffer.

Step 99 also increments a counter each time a new buffer is created. The purpose of this counter is to keep a running count of how many buffers have to be checked by the process of steps 101 and following so it can be known when all buffers have been checked.

Step 101 represents the process of setting a buffer pointer i to the beginning buffer number. Next, step 103 determines whether the buffer currently pointed to by i has collected 7 MPEG packets. If not, test 105 is performed to determine if the timer for buffer i has timed out yet. If test 103 determines that 7 MPEG packets have been collected in buffer i, then step 107 is performed to write all the MPEG packets in buffer i into an IP packet payload section. Then step 107 purges buffer i and resets the timer for buffer i. If test 105 determines that the timer for buffer i has timed out, then step 109 is performed to write however many packets have been collected in buffer i into the payload of an IP packet.

If test 105 determines that the timer for buffer i has timed out, step 111 is performed to increment the buffer pointer i by 1. Then, test 113 is done to compare the incremented i to the current count of how many PID buffers there are to determine if the last of the PID buffers has been checked. If test 113 determines that not all buffers have been checked yet, processing returns to test 103. If test 113 determines that all the buffers have been checked, then processing returns to step 101 to set the buffer pointer i back to the number of the first buffer (step 99 is ongoing in background) and processing of test 103 and following is repeated.

Once an IP packet payload section has been written in either steps 107 or 109, step 115 is performed to write an IP multicast destination address for the packet. This is done by using a predefined IP multicast prefix such as 239 and completing the rest of the dotted decimal IP address with the PID and multiplex number of all the enclosed MPEG packets. The IP header source address is a don't care.

Next, step 117 encapsulates the IP packet in an Ethernet (or other LAN) packet and generates an Ethernet station address from the IP packet destination address in the same way as previously described for step 45 of FIG. 3. Finally, step 119 outputs the Ethernet packet to the packet switch 10 and starts over for new incoming MPEG packets. Step 119 also, optionally, resets the PID buffer counter and clears the PID/multiplex pair list. The reason this is preferred is that the number of PIDs in use at any particular time varies up and down so if the PID buffer counter is never reset from some peak value of PID buffers when far fewer PIDs are currently in use, time will be wasted by the computer in checking buffers for PIDs that are no longer in use.

Returning to the consideration of FIG. 1, the function of the packet switch 10 is to receive the Ethernet packets output on LAN segment 28 and create a data path for these packets to any cherrypicker switch which has asked for packets addressed to a particular Ethernet station address. The packet switch then performs a prescreening and filtering process so the cherrypicker switches 30 and 32 only receive Ethernet packets they asked for.

The cherrypicker switches 30 and 32 are generally structured and operate in the same manner as the cherrypicker switches in the prior art except for a couple of differences. First, the cherrypicker switches must have circuitry and/or software to receive data from the computer 44 defining the VOD selections and other requests for IP packet-based services from the internet that have been made by the customers. This circuitry and/or software must be able to convert that data into Ethernet packets addressed to the packet switch 10 telling it which Ethernet station addresses to send to the cherrypicker switch. Second, each cherrypicker switch in the invention generates multiple MPEG transport streams as opposed to the one MPEG transport stream generated in the prior art cherrypicker switches. Thus, the cherrypicker switches of the invention have software and/or hardware which keeps track of which customers will be served by each MPEG transport stream and which requests came from each customer so that incoming Ethernet packets have their encapsulated MPEG packets put into the correct MPEG transport stream. Finally, in some embodiments, the amount of downstream bandwidth available to send requested data to each customer may vary with different subscription packages, the distance of the customer from a DSL central office, the amount of available bandwidth devoted to digital services on a shared medium like HFC, line conditions, etc. The cherrypicker switches according to the invention will preferably have circuitry and software to look up or otherwise receive data regarding how much downstream bandwidth is available to send requested data or pushed data to a customer and decompress the incoming MPEG packets bound for that customer and recompress the data down to the downstream bandwidth available to send that data to the customer. If the amount of downstream bandwidth for a customer is fixed, this can be a simple lookup table of hardwired or configuration data. If the amount of bandwidth varies, and management and control process in computer 44 or another managment and control process in computers in cherrypicker switches 30 and 32 can determine the amount of bandwidth currently available for a customer and write that data into a lookup table stored in each cherrypicker switch 30 and 32.

The cherrypicker switches are represented by blocks 30 and 32, but there can be an arbitrary number of them. The cherrypicker switches 30 and 32 function to send Ethernet packets to switch 10 telling it which MPEG packets each cherrypicker wants sent to it. The cherrypicker switches 30 and 32 ask for particular MPEG packets with specific PIDs to get the video programs they want by requesting packet switch 10 to route all Ethernet packets having Ethernet station addresses (Ethernet destination addresses) that correspond to the PIDs desired.

The cherry picker switches know how the Ethernet station addresses are calculated in the IP wrapper circuit 12 from the PIDs and simply repeat the calculation using the desired PIDs to arrive at the Ethernet station addresses that are sent to the packet switch 10. The cherrypicker switches can be hardwired or configured with configuration data that defines which PIDs will be arriving on which input lines to the IP wrapper circuit 12 so that the calculation of the Ethernet station address for each PID done in the IP wrapper circuit 12 can be repeated in each cherrypicker switch 30, 32 etc. The same is true for embodiments discussed elsewhere herein where an upstream request processing CPU 44 calculates the Ethernet station address. The CPU 44 can be configured with a table that lists which PIDs will be arriving on each input line to allow it to calculate the Ethernet station addresses.

In alternative embodiments, the IP wrapper circuit will multicast the Ethernet station addresses it calculates from each PID and input line calculation to all the cherrypicker switches which record these mappings in a lookup table. It is preferred to just duplicate the calculation of the Ethernet station addresses in each cherrypicker switch to hold down overhead message traffic through the switch 10.

In a first "broadcast only" embodiment, the circuit of FIG. 1 will generate one or more output MPEG transport streams shown generally at 34 and each MPEG transport stream will have a fixed content of video programs (no VOD or other upstream requests from customers allowed). There will be no IP internet packets from web server 22 in any MPEG transport stream and, optionally, there will be no MPEG video packets from other metro area headends 24 in the MPEG output streams. The fixed content of video programs for each MPEG transport stream will be established by the cable or DSL system operator, and no upstream requests from customers will be received or processed. The PIDs of the fixed content to be culled out by each cherrypicker switch 30 and 32 will be hardwired into the switch or stored in configuration data.

In a "video-on-demand embodiment", upstream VOD requests and other requests for IP packet-based services from the internet or other sources such as T-carrier systems, WAN links, etc. are allowed. The upstream can be anything. For example, the network front end cherrypicker of FIG. 1 in this embodiment will optionally have a web server 22 and its LAN link 36 to the packet switch if the upstream data path can include an internet connection. If upstream VOD and other requests can call for data which has to come from other metro area headends 24 or the national backbone 26, the LAN segment or other data path 38 to other metro area headend systems also will exist. What distinguishes this VOD embodiment from the broadcast only embodiment, described above, is the existence of any upstream data path through which customers can transmit their requests for video-on-demand selections to the cherrypicker switches 30 and 32, and the circuitry and the software in the cherrypicker switches to honor those requests.

The upstream data path can be anything including: the upstream data channel of a DSL line; the upstream channel of a digital cable HFC system; a conventional direct dial up modem connection over the public service telephone network to the headend; a internet-based data path such that a browser can be pointed to web server 22 and the VOD selections transmitted to the web server 22 as IP packets and then encapsulated into Ethernet packets addressed to the particular cherrypicker switch responsible for culling out the MPEG packets that will be in the MPEG transport stream transmitted to the customer that made the request; a frame relay or point-to-point WAN; or a simple telephone call to a human operator at the headend who sits at a workstation and selects the VOD selection from a menu according to voice instructions from the customer with the workstation then mapping the title of the selection to its PID and transmitting the PID to the appropriate cherrypicker switch directly or through the packet switch 10.

This upstream data path and upstream processing apparatus is generally shown in dashed lines in FIG. 1 to indicate that it is present only for the VOD embodiments and not the broadcast-only embodiments. Those skilled in the art will appreciate that there are many different hardware and software configurations inherently disclosed in the above described upstream data paths, and each is well within the skill of the art to implement. However, the most common hardware configurations are represented by the web server 22 for internet based upstreams and by computer 44 and modem/receiver 46 for DSL and cable system hybrid fiber coax (hereafter HFC) upstream data paths.

For DSL upstreams, dashed line 50 represents the DSL telephone line to one customer (any form of DSL including ADSL and HDSL). Block 46 represents a DSL modem at the central office/headend. There will be multiple DSL lines to all the customers and there will be one DSL modem at the headend for each DSL line being served, but only one DSL modem is shown for simplicity. Block 46 represents only the upstream receiver circuitry of the DSL modem, and the downstream circuitry of the DSL modem for each line receives the MPEG transport stream in MPEG outputs which has been generated for the particular customer to whom the DSL line is coupled. The DSL modem upstream circuitry coupled to the DSL line coupled to a particular customer receives upstream VOD requests made by that customer which are transmitted by a DSL modem at the customer premises on the DSL upstream frequency division multiplexed logical channel. These VOD requests are transferred via data path 48 to an upstream request processing CPU 44 which maps the requests into corresponding PIDs and encapsulates them into Ethernet packets addressed to the appropriate cherrypicker switch 30 or 32 responsible for culling out PIDs for the MPEG transport stream being transmitted to the customer on that customer's DSL line.

The Ethernet packets for requests from each customer are transmitted over a LAN segment 52 to the packet switch 10. The switch 10 routes the requested packets to the appropriate cherrypicker switch 30 responsible for culling out MPEG packets that correspond to the requested PIDs. The cherrypicker switches may optionally send back to the switch an Ethernet packet which tells the packet switch 10 which Ethernet packets to send to the cherrypicker switch, but if the packet switch 10 already knows the requested PIDs, it can make the Ethernet station address mapping calculation itself or request the upstream request processing CPU 44 to make the calculation and return the Ethernet station address that corresponds to each PID to the packet switch and then automatically route all Ethernet packets addressed to the Ethernet station addresses that correspond to requested PIDs to the appropriate cherrypicker switch that requested them.

Of course, if the cherrypicker of FIG. 1 is operating in both push and pull mode, the pushed video programs for which there have been no requests will be the subject of Ethernet packets sent from the cherrypicker switches 30 and 32 to the packet switch 10 and this will not be an optional communication in embodiments where the packet switch 10 does not know the programs that are being pushed by each cherrypicker switch.

If all logical channels on each output MPEG transport stream are pull mode meaning they only carry data that has been specifically requested, then the packet switch 10 will know all the requested PIDs if all requests are passed to the packet switch 10 as Ethernet packets for routing to the appropriate cherrypicker switch. However, some embodiments may have the upstream request processing CPU coupled directly to the cherrypicker switches 30 and 32 to pass the requested PIDs or corresponding Ethernet station addresses directly to the CP switches 30 and 32 without consuming bandwidth of the packet switch 10. The communication of the requested PIDs to the cherry picker switches either directly from the CPU 44 or from the packet switch 10 is represented by dashed line 54.

The packet switch 10 or the CPU 44 will assemble an Ethernet packet or IP packet or other message addressed to local video server 20 or a satellite uplink station 56 or to the other metro area headends 24 indicating the PIDs which have been requested. This packet or message will be sent to the appropriate facility that can supply the requested video data by any appropriate data path represented by dashed line 58. If the source of the requested VOD data is the local video server 20, data path 58 can be a LAN segment on the LAN that couples the IP wrapper 12 to the packet switch 10. If the source of the VOD data is a video server in the satellite uplink station 56 or a video server in another headend in the collection of metro area headends 24, data path 58 can be a direct modem dial-up connection, the internet, a T-carrier or partial T-carrier link, a wide area network link such as a frame relay or point-to-point link over the PSTN etc. It does not matter how the data regarding the requests get to the video servers that will serve the VOD data.

If the source of the requested VOD data will be a video server at satellite uplink station 56, the VOD data will be transmitted up to the appropriate satellite and transmitted back down to a receiver (not shown) at the location of the headend cherrypicker shown in FIG. 1. From the satellite downlink receiver, the VOD data will be transmitted as an MPEG transport stream to the IP wrapper 12 via line 14 or 16.

If the source of the VOD data is a local video server 20, the VOD data will be input to the IP wrapper circuit 12 as an MPEG transport stream on line 18.

If the source of the VOD data is a video server located at some other metro area headend 24 or a video server at a headend somewhere out on the national backbone, the VOD MPEG transport stream data will be transmitted via a wide area network (hereafter WAN) links 60 and 38 to a WAN interface 62. The WAN interface receives and recovers the MPEG packets encapsulated in WAN packets or frames. The WAN interface 62 then encapsulates the MPEG packets into IP packets which are then encapsulated into Ethernet packets by a slightly modified version of the process of FIG. 3. The only modification necessary is to add steps to receive the incoming MPEG packets of the transport stream encapsulated in WAN packets and to recover the MPEG transport stream and then perform steps 41 through 51 of FIG. 3.

For HFC bidirectional digital data communication, upstream data path 50 represents the HFC of the cable plant, and block 46 represents a cable modem such as are commercially available from the assignee of the present invention and several other companies including 3-COM. The cable modem recovers and sorts out all upstream VOD requests transmitted from each customer on the shared HFC and transfers the recovered data via data path 48 to upstream request processing CPU 44. There the requested titles are mapped to the corresponding PIDs and the PIDs are encapsulated into Ethernet packets and sent to the cherrypicker switches #1 30 and 32. That cherrypicker switch will then send an Ethernet packet to switch 10 telling it which encapsulated MPEG packets bearing Ethernet station addresses correponding to the VOD request(s) to route to it for use in constructing the MPEG transport streams it is constructing. Switch 10 will then route all encapsulated MPEG packets it sees with the requested Ethernet station addresses to the cherrypicker switch that requested them.

In one HFC "hardwired" embodiment, the computer 44 knows which cherrypicker switch is generating the MPEG transport stream multiplex for the customer which made a VOD request and sends the VOD request to that cherrypicker switch. That cherrypicker switch will then generate and send an Ethernet packet to switch 10 telling it which encapsulated MPEG packets bearing Ethernet station addresses corresponding to the VOD request(s) to route to it for use in constructing the MPEG transport streams it is constructing. Switch 10 will then route all encapsulated MPEG packets it sees with the requested Ethernet station addresses to the cherrypicker switch that requested them.

In other HFC VOD embodiments, each VOD request encapsulated in an Ethernet packet is broadcast to all cherrypicker switches 30 and 32, and the cherrypicker switches then examines each received request and determine which requests have been received from a customer for which that cherrypicker switch is preparing VOD data in an MPEG transport stream. That cherrypicker switch will then send an Ethernet packet to switch 10 telling it which encapsulated MPEG packets bearing Ethernet station addresses correponding to the VOD request(s) of one of that cherrypicker switches customers to route to it for use in constructing the MPEG transport streams it is constructing. Switch 10 will then route all encapsulated MPEG packets it sees with the requested Ethernet station addresses to the cherrypicker switch that requested them.

Basically, in an HFC environment, the downstream may take several forms, but in each form there will be a plurality of logical channels. How the logical channels are kept separate from each other is a matter of choice and is not part of the invention. For example, there may be multiple frequency division multiplexed 6 MHz carriers each of which carries multiple subchannels of digital data that are kept separate by their PIDs. In other embodiments, the subchannels may be kept separate by code division multiplexing or synchronous code division multiplexing or time division multiplexing or discrete multitone modulation or any other way of keeping the data bound for each customer separate from data addressed to other customers.

Typically, in the HFC environment, each cherrypicker switch will be generating one or more MPEG transport stream multiplexes to transmit on one or more logical channels and subchannels of the downstream HFC. In some embodiments, specific users will be assigned on a "hardwired" basis to specific logical channels and/or subchannels, and in other embodiments, the specific users demands will be load balanced among the available logical channels and subchannels, and downstream messages will be sent to each user's equipment telling it upon which logical channel(s) and subchannel(s) the requested data has been transmitted.

In still other "load balanced" embodiments, there will be a management and control process in computer 44 that knows how many tuners each users has and keeps track of the number of requests each user has currently being serviced and will transmit load balancing data to each cherrypicker switch via Ethernet packets telling each cherrypicker switch which PIDs or Ethernet station addresses to request from switch 10 and which logical channels and subchannels to put them on as MPEG transport streams. The computer 44 will take into account how many tuners each user has and attempt to honor all requests from that user on open subchannels of a number of logical channels that does not exceed the capacity of that user's gateway to simultaneously tune or otherwise receive. Any algorithm to do a load balancing function and accommodation to the number of tuners each user has is within the scope of the invention.

Each cherrypicker switch 30 and 32 sends the packets defining which Ethernet station addresses (the term Ethernet station address will be used to designate Ethernet packets having as their destination addresses the specified Ethernet station addresses) to route to it over a 1 gigabit or 100BaseT Ethernet LAN segment that couples the cherrypicker switch to the packet switch 10. LAN segments 70 and 72 perform the function of conducting packets that designate the desired Ethernet station addresses to packet switch 10. The preferred LAN protocol and medium for LAN segment 70 and 72 is Gigabit Ethernet. These packets are sent to packet switch 10 via a known protocol called the Internet Group Multicast Protocol. This protocol is widely used.

LAN segments 70 and 72 also perform the function of conducting the Ethernet packets containing the desired MPEG packets with the PIDS that correspond to the designated Ethernet station addresses back to the cherrypicker switches 30 and 32.

The cherrypicker switches construct their transport streams from the data sent by the packet switch 10. In this process, they do any necessary bandwidth adjustments to conform the streams consumed bandwidth to the available bandwidth of the downstream medium. Available bandwidth information and the PIDs of any programs to be "pushed", that are transmitted even though there have been no specific requests are sent to the cherrypicker switches by a management and control process. This process can run on computer 44 and send information to the cherrypicker switches by Ethernet packets routed via data path 52, switch 10 and LAN segments 70 and 72 or by dedicated data path 54 in some embodiments. In other embodiments, a separate management and control process running on another computer (not shown) can perform this function and send the necessary data to the cherrypicker switches 30 and 32 by any suitable data path.

Figure 5:
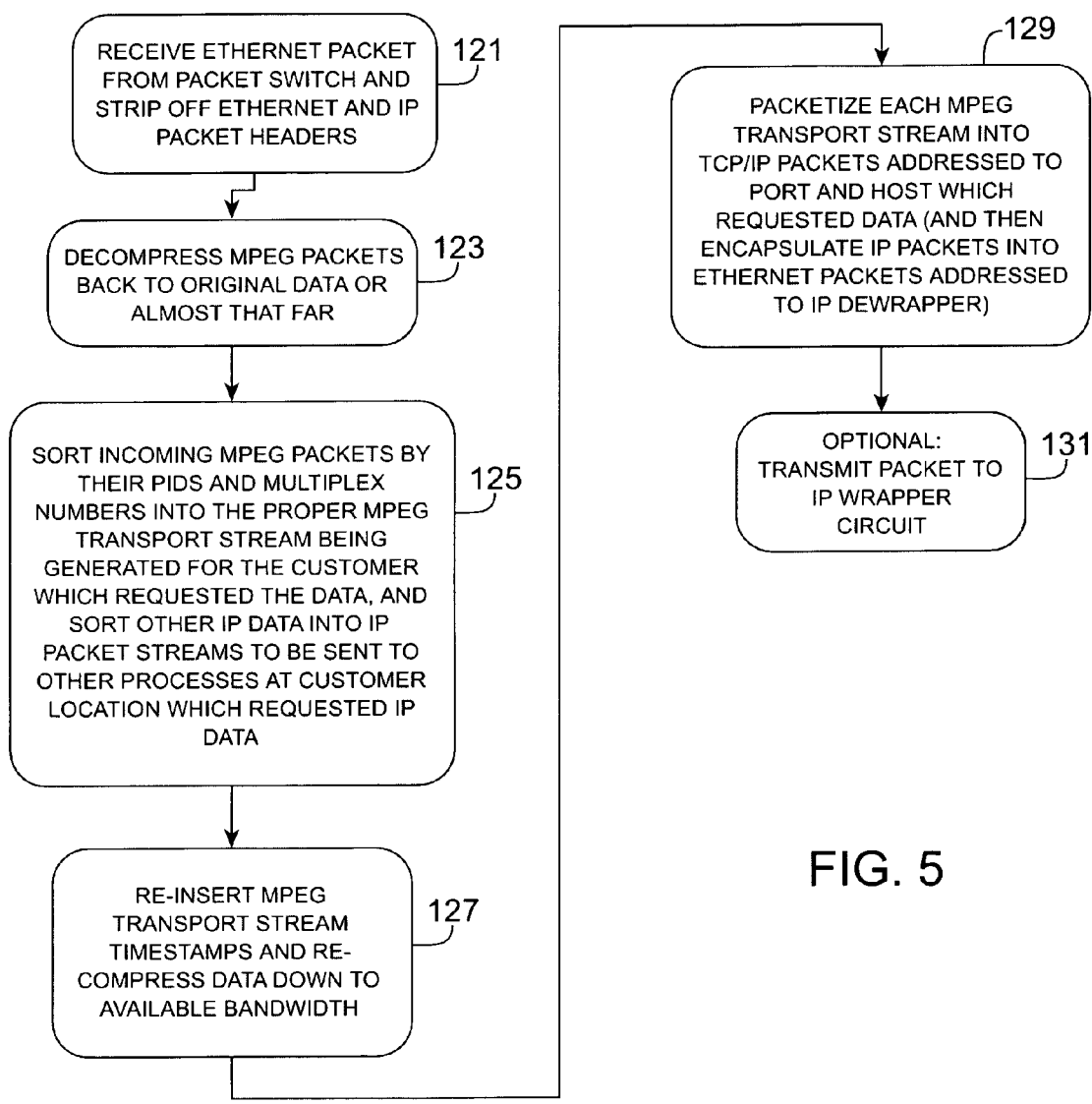
FIG. 5 is a flowchart of the process of generating the MPEG transport streams in each cherrypicker switch 30 and 32.

The process of generating the MPEG transport streams in each cherrypicker switch 30 and 32 is detailed in FIG. 5. Step 121 represents the process of receiving the Ethernet packets sent from the packet switch to the cherrypicker switches and stripping off the Ethernet and IP packet header information.

Step 123 represents the process of decompressing the MPEG packet data back to the completely uncompressed level or almost that far if complete decompression is not necessary. This decompression step is only necessary in environments where the downstream bandwidth all the way to the customer's settop decoder is inadequate to handle the bandwidth of the incoming MPEG packet data because the MPEG data will need to be re-compressed down to a bandwidth that can be transmitted all the way to the settop decoder box. If there is sufficient bandwidth all the way from the headend to the settop decoder to handle the bandwidth of the incoming MPEG packets to a cherrypicker switch, step 123 can be eliminated.

Step 125 represents the process of sorting the incoming MPEG packets by PID and multiplex number into the proper MPEG transport stream being generated for the customer that requested the VOD selection or a transport stream for pushed programs. This process involves looking up each PID and multiplex number in a table that maps the current VOD requests and programs to be pushed to PID and multiplex number and identifies the MPEG transport stream which will be transmitted to the customer making the request or used for pushed broadcasts for which no requests have been made. Typically, in an HFC environment, each customer will be tuned to one 6 Mhz logical channel and will share the 16–18 subchannels thereon with other customers.

Other Ethernet packets that encapsulate IP packets with TCP and IP headers from the internet that the customer requested and which have been routed through the packet switch 10 to a cherrypicker switch are passed to a TCP/IP protocol stack. This protocol stack is resident in a computer in the cherrypicker switch. The TCP protocol uses the port address in the TCP header to establish a logical connection to the particular process running in a computer at the customer site that has that particular port address and cooperates with its peer process at the customer site computer to keep track of the blocks of data to insure that all are delivered reliably. This logical connection is established over a logical channel on whatever downstream medium is being used for the downstream and upstream connections. The IP protocol in the cherrypicker switch using the IP destination address in the IP header to route the IP packet data to the proper IP packet stream that will be transmitted over the logical channel to the host at the customer site that has been assigned to that IP address. When each process at the customer site that desires broadband internet access boots up, it establishes an upstream connection to an address resolution protocol process running on computer 44 or some other computer at the headend (or central office, i.e., "CO", where the cherrypicker switches are). This connection is established over whatever upstream data path connects the customer site to the headend or CO. The address resolution protocol establishes a TCP port address for the process and an IP address for the host on which the process is running. The process that received the port address and the host IP address then uses that TCP port address and host IP address as source addresses in subsequent requests for IP data from the internet or other sources. Whatever computer that assigns the TCP port address and IP address for a process at a customer site transmits the address information along with a customer ID to the specific cherrypicker switch(es) that will be generating the IP packet stream(s) that goes to that customer site. The cherrypicker switches can then use the destination port address in the TCP header and the IP destination address in the IP header of incoming TCP/IP packets to route the data to the proper packet stream. That packet stream will be transmitted on a particular downstream logical channel and subchannel to the customer and a downstream message will be sent to the customer telling her tuner(s) where to tune to receive this IP data. The processes of using TCP/IP protocol stacks to transmit data over different kinds of networks from one host to another are described in Stallings, *High Speed Netowrks, TCP/IP and ATM Design Principles* (Prentice Hall 1998) ISBN 0-13-525965-7 which is hereby incorporated by reference.

Step 127 represents the process of re-inserting new MPEG timestamps into each MPEG transport stream and re-compressing the data down to the available bandwidth for digital data delivery to this customer site. The decompression and recompression are done by recoder integrated circuits which are publicly known and which are commercially available from Terayon Communication Systems, Inc. of Santa Clara, Calif. These recoder chips have been patented by Imedia as U.S. Pat. No. 5,956,088, which is hereby incorporated by reference. In simple embodiments where every user has a fixed assigned bandwidth that does not vary, this simply involves looking up the available bandwidth for this user and recoding down to that bandwidth. In more complex embodiments where a management and control process is monitoring available bandwidth, step 127 still involves a table lookup, but there is an auxiliary process which receives updates on available bandwidth for each user from the management and control process and updates the entries in the table for each user.

Step 129 represents the process of packetizing each MPEG transport stream into IP packets and encapsulating the IP packets into Ethernet packets. Specifically, groups of 7 consecutive MPEG packets from each MPEG transport stream are written into the payload section of an IP packet. That is then passed to a UDP/IP or TCP/IP protocol stack of processes in the cherrypicker switch with instructions to send it to a particular port at a particular host at a particular customer.

The UDP/IP or TCP/IP protocol stacks add TCP or UDP header information that addresses the data to the particular port for the process that requested it, and the IP stack adds header address information addressing it to a particular host at the customer site. The term "host" is intended to mean any computer, settop decoder box, digital VCR, videophone, intelligent remote with video preview capability or any other circuit running one or more processes which consume video or other data. The resulting packet is sent to the network MAC layer which encapsulates it into an Ethernet packet addressed to the IP dewrapper circuit 76 in FIG. 1 and transmits it over LAN link 70 or 72 to the packet switch, as symbolized by step 131. The packet switch then routes the packet to the IP dewrapper circuit via LAN segment 74. The preferred medium type and protocol for LAN segment 74 is 100BaseT Ethernet.

The IP dewrapper circuit 76 functions to strip off the Ethernet and IP packet header information and sort out the different MPEG transport streams and route them to the appropriate DSL modem or put them into the appropriate logical channel and subchannel on the downstream HFC or other medium. In environments where all the customers have settop decoders that can receive Ethernet packets containing IP packets containing MPEG packets and strip off the Ethernet and IP packet headers and decompress the MPEG packets to generate video and/or audio signals and IP data, and the downstream media is capable of transmitting Ethernet packets, the IP dewrapper circuit 76 is not necessary. Such embodiments are especially useful in Fiber To The Curb environments which will become more prevalent in the future. In the preferred embodiment, the IP dewrapper circuit is implemented by a field programmable gate array.

It will be understood by those skilled in the art that there is an important class of alternative embodiments where no IP dewrapper circuit at all is used. This class of embodiments functions in environments where the downstream channel can carry TCP/IP packets and each customer has a distribution network to one or more host computers running one or more MPEG and IP data consuming processes each of which has its own TCP port address. In other words, this class of embodiments with no IP dewrapper are used in environments where every customer has TCP/IP connectivity capability to every process in the customer's distribution network. Such environments include home gateways which distribute incoming data from satellite, HFC, DSL and other sources to different host computers and set top decoder processes via one or more local area networks. In such embodiments, the TCP/IP (or UDP/IP) header information added to the TCP/IP (or UDP/IP) packets that transport the MPEG transport stream data is important in making sure that each MPEG transport stream reaches the correct process at the customer site.

For example, suppose a customer has two TVs each with its own set top decoder box and each of which is capable of making independent VOD requests and also has one or more computers each of which may be requesting different web page information from the internet. Both computers and set top decoders are coupled by a high speed 100BaseT LAN to a home gateway which is coupled to an HFC cable or a DSL line or a satellite dish, or some combination. In such a case IP packet data and MPEG data packetized in IP packets may be arriving on both HFC and DSL and the port addresses and IP addresses in the TCP/IP headers are necessary to route the data from each source to the proper host and the proper process on that host which requested it.

Figure 7:
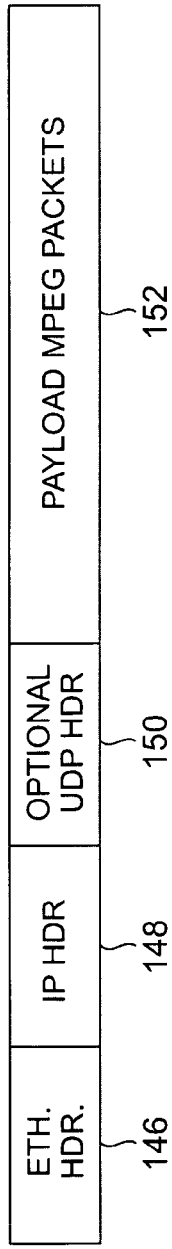
FIG. 7 is a diagram of the packetized MPEG data of each transport stream which is output by the cherrypicker switches in either an environment where there is UDP/IP or TCP/IP connectivity all the way to the requesting process or where an IP dewrapper is used.

A cherrypicker operating at either the central office or the cable headend in this environment with UDP/IP connectivity all the way to the requesting process does not need an IP dewrapper circuit since the UDP or TCP packet header and IP header of the packetized MPEG transport stream data is needed by the downstream equipment to route the data to the correct requesting device. In embodiments with UDP/IP or TCP/IP connectivity all the way to the requesting process, the cherrypicker switches do not need to send packets to an IP dewrapper circuit 76, but they will need to route the packets to the correct DSL modem or the correct cable modem or the correct modulator of a cable modem that transmits multiple 6 MHz channels downstream. FIG. 7 is a diagram of the packetized MPEG data of each transport stream which is output by the cherrypicker switches in either an environment where there is UDP/IP or TCP/IP connectivity all the way to the requesting process or where an IP dewrapper is used. Ethernet header 146 is used by the packet switch 10 to route the packet to the IP dewrapper circuit 76 or, in embodiments where there is UDP/IP connectivity all the way to the requesting process, to route the packet to the correct DSL modem or cable modem serving the customer premises where the requesting process is in execution. The IP header 148 is used by a gateway or other device at the customer premises to route the packet to the proper host on a local area network at the customer premises. The UDP or TCP header 150 is used to route the packet to the correct port in the host identified by the IP address to which the requesting process is listening for its requested data. Payload section 152 is a collection of MPEG compressed data packets of the transport stream that carries the requested program.

The UDP or TCP header 150 is optional in embodiments to be used where there is no TCP/IP connectivity to the requesting process. In these embodiments, the customer usually only has one or two tuners and no gateway with the tuners connected to a display device like a TV. In this environment, there is no need for a port address in the UDP header, and the requested or pushed video and audio data is transmitted to the customer on a logical channel and subchannel which is identified in a downstream message. The tuner then tunes to that channel and recovers the MPEG transport stream and filters out the packets with the PIDs of the desired programs and converts that data to a video and audio signal to feed to the display device. There is no packet routing needed at the customer location in this simpler embodiment, so the UDP header is optional.

Figure 6:
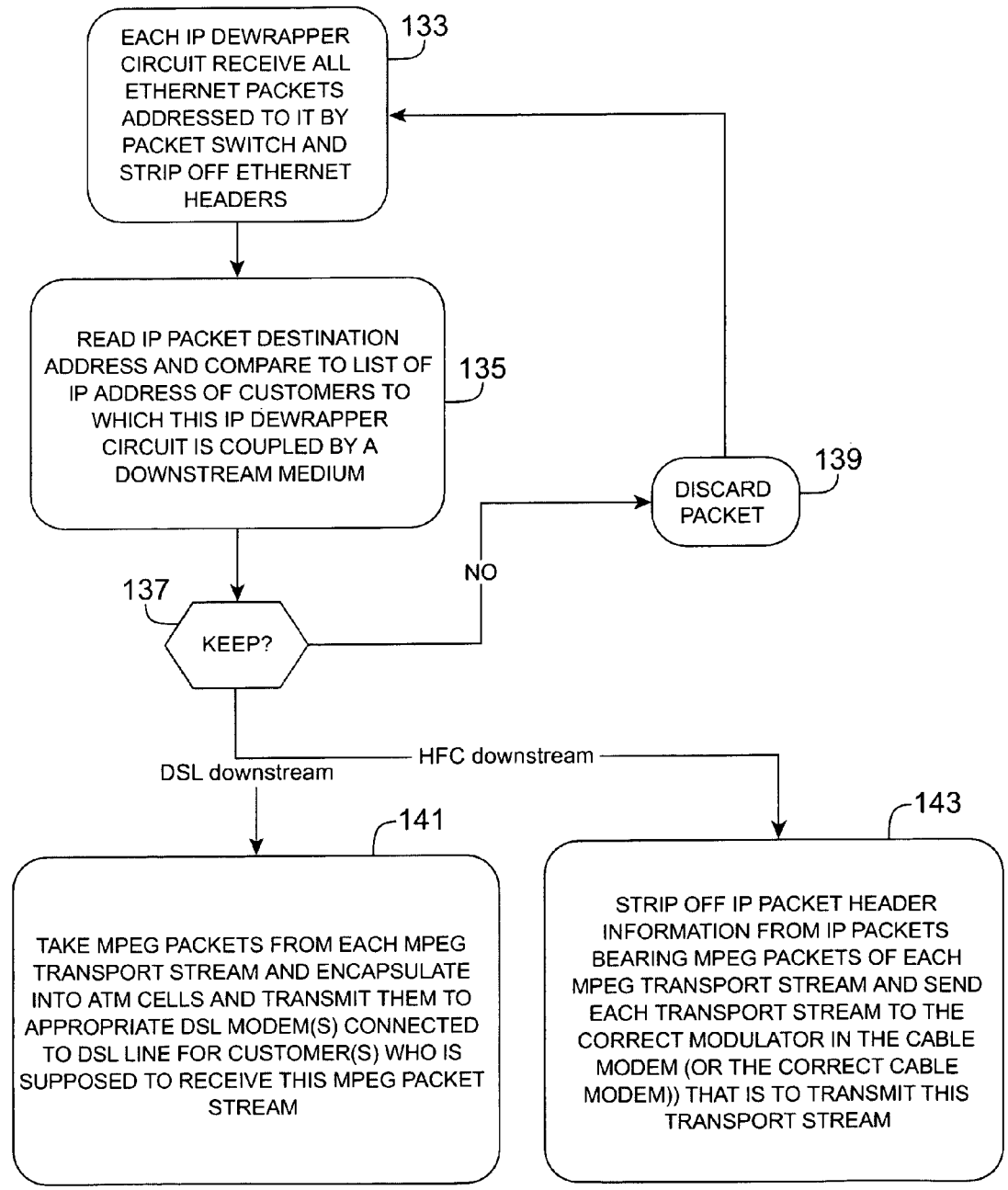
FIG. 6 is a flowchart of the functions carried out by the IP dewrapper process for embodiments where pure MPEG transport streams are transmitted downstream.

FIG. 6 is a flowchart of the functions carried out by the IP dewrapper process for embodiments where pure MPEG transport streams are transmitted downstream. Such embodiments are useful in environments such as HFC where there are multiple 6 MHz bandwidth, frequency division multiplexed downstream carriers each of which carries a single MPEG transport stream. Each carrier is one logical channel with multiple subchannels. Each transport stream has a bandwidth of 38 MBPS and carries from 12 to 18 different video programs with different PIDs. These different PIDS are separated out by the processes at the customer to tune to the program the user wants to see in broadcast or push only embodiments, or the program the customer ordered in VOD alone or VOD plus push environments. In broadcast only environments, each program is transmitted on a fixed logical channel and one or more fixed subchannels so there is no need for downstream messages to the customers since the whole system is "hardwired". In VOD environments however, when VOD selections are sent downstream on available logical channels and subchannels, downstream messages are sent to the customers telling their tuners which logical channel to tune to and which subchannels on which the requested data will be found. In such environments, there is no need for the TCP/IP header information in the IP packets encapsulating the MPEG data for use in routing once it gets to the customer site so an IP dewrapper is used.

Step 133 represents receiving the Ethernet packets containing each MPEG transport stream and stripping off the Ethernet headers. Step 135 represents the function of reading the IP host addresses in the header information of the TCP/IP packets encapsulated in the Ethernet packets and comparing it to a list of the IP host addresses assigned to customers to which the IP dewrapper circuit is coupled by a downstream medium. Step 137 decides whether the packet is addressed to a customer of this particular IP dewrapper circuit (there may be more than one IP dewrapper circuit and they may all receive the same Ethernet packets). If so, either step 141 or step 143 is performed depending upon whether the downstream medium is DSL or HFC. If the packet is not for one of the IP dewrapper customers, step 139 is performed to discard it. Similar processing to the HFC processing of step 143 is performed if the headend cherrypicker is being used in a satellite uplink for DirecTV and DirecPC or similar services. If there is only one IP dewrapper circuit and it is coupled to all customers, steps 137 and 139 are omitted.

Step 141 is performed in DSL downstream environements. The MPEG packets from each individual MPEG transport stream and encapsulated into ATM cells. This can be done in any way, but preferably is done using the AAL5 standard to break up each 2 MPEG packets into 8 ATM cells. The ATM cells so generated are then transmitted to the proper DSL modem(s) coupled to the DSL line coupled to the customer(s) who is supposed to receive the video programs contained therein and a downstream message is sent to that customer telling her which subchannels her requested programs will be on by PID or some other suitable means. Similar processing is performed for IP broadband internet access data packets by encapsulating them into ATM cells and sending to the correct DSL modem.

Step 143 is performed if the downstream medium is HFC. In step 143, the IP packet header information is stripped off the IP packets bearing the MPEG data of each MPEG transport stream and the MPEG transport stream is reassembled and sent to the correct cable modem modulator for the 6 MHz bandwidth logical channel on which it is to be sent. There may be a single cable modem for each downstream carrier/logical channel to carry one transport stream. In such a case, the transport stream is sent to the proper modem MPEG data input. If one cable modem with multiple downstream modulators is used, the data from each transport stream is sent to the correct modulator input.

MPEG transport streams use fixed length, relatively short data structures that can be well processed in a networked environment. They are defined in Orzessek and Sommer, *ATM & MPEG-2, Integrating Digital Video into Broadband Networks*, (Prentice Hall 1998), ISBN0-13-2453700-7, the entirety of which is hereby incorporated by reference. The relationship between access units of elementary streams and the Packetized Elementary Stream (PES) packets that are generated from the elementary streams and the Transport Stream packets (referred to herein as MPEG packets) generated at fixed lengths from the variable length PES packets is shown in FIG. 3.22 at page 105 of the Orzessek treatise. The PES packet headers include data about the type of elementary stream (video or audio) data which is in the payload, while the MPEG packet header includes information needed to transport and deliver the stream. There are Single Program Transport Streams (SPTS) which carry different PES streams which all share a common time base and Multi Program Transport Streams which are a multiplex of a number of SPTS each of which has a different timebase.

The systems layer of the MPEG-2 standard provides the necessary functionality to: extract a single program out of a transport stream containing multiple programs; extract a subset of programs out of a single transport stream containing a collection of programs; or create a single transport stream containing a collection of programs out of several transport streams. The combination of the packet switch 10 and each cherry picker switch 30 and 32 perform this last function to create multiple transport streams. Timestamp information is added by a MPEG-2 systems multiplexer/encoder that generates each transport stream (wherever generated) so as to maintain synchronization between video and associated audio data.

Figure 8:
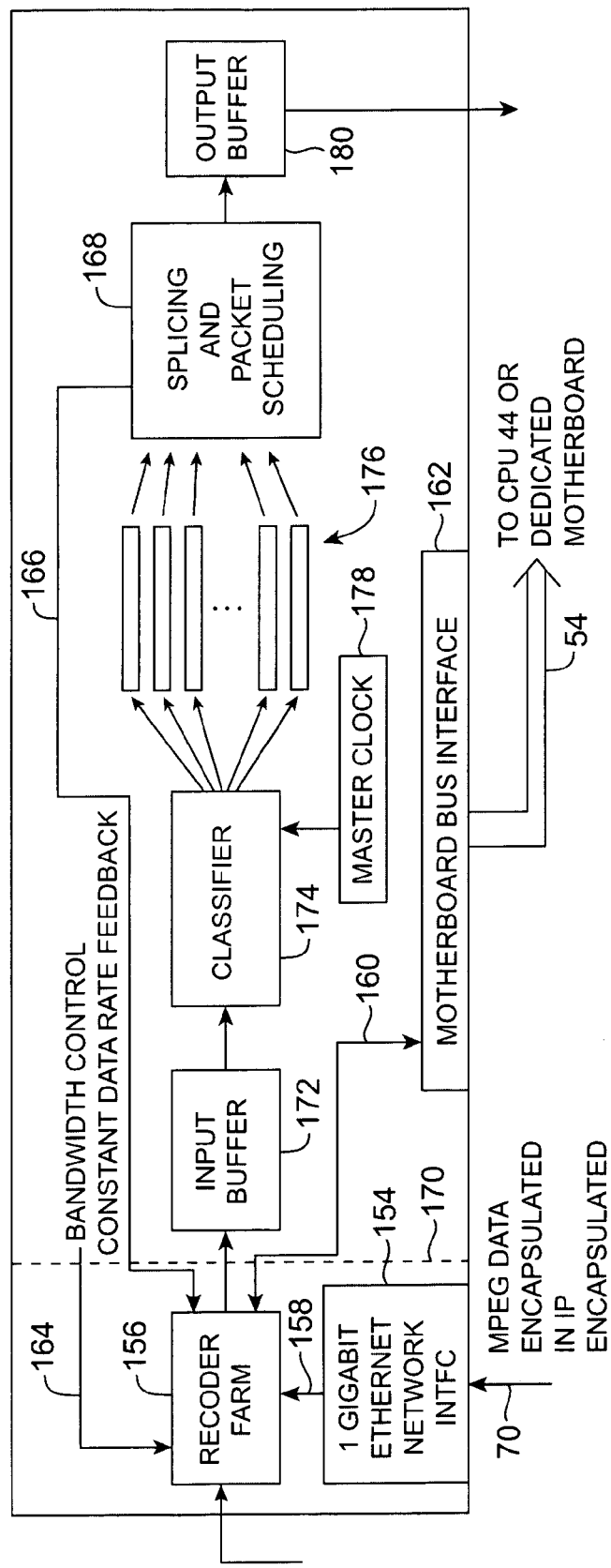
FIG. 8 shows a block diagram of the circuitry and software processes that perform the functions of the cherrypicker switches 30 and 32 in FIG. 1.

Referring to FIG. 8, there is shown a block diagram of the circuitry and software processes that perform the functions of the cherrypicker switches 30 and 32 in FIG. 1. Generally, the blocks to the left of the dashed line 170 are implemented in hardware, preferably an FPGA, and the blocks to the right of dashed line 170 are implemented in software on a motherboard. Each cherrypicker switch 30 has its own motherboard computer which controls the recoder chips 156 and performs various functions in software described elsewhere herein. In some embodiments, the motherboard software processes perform the UDP/IP protocols and Ethernet packet encapsulation and also perform DSM-CC protocols on top of the UDP/IP protocols to establish an application session between the video server at the headend and the settop decoder at the user premises. DSM-CC protocols have been established by the MPEG standardization group and are described in Chapter 3.6 of the Orzessek reference incorporated by reference herein. More details about MPEG and encoder and decoder hardware therefor can be found at http://www.mpeg.org and in a treatise by Vasudev Bhaskaran and Konstantinos Konstantinides, *Image and Video Compression Standards, Algorithms and Architectures* (Kluwer Academic Publishers: New York, 1995), both of which are hereby incorporated by reference.

In some embodiments, the cherrypicker switches 30 and 32 can share one computer such as computer 44 in FIG. 1, but, in the preferred embodiment, each cherrypicker switch has its own computer to which it is connected by bus connection or dedicated data path 54 or by any other suitable data path such as by Ethernet packets sent from the cherrypicker switch to the computer 44 through packet switch 10.

A one gigabit Ethernet interface 154 to LAN segment 70 (1000BaseSX or 1000BaseT) receives the MPEG data and strips off the Ethernet headers. The MPEG data encapsulated in IP packets is then transferred directly to a recoder farm 156 via path 158 if the recoder chips are available or transferred for temporary storage to main memory on a motherboard (not shown in FIG. 8 but shown as computer 44 in FIG. 1 as one embodiment) via path 160 and a motherboard bus interface 162. The reason incoming MPEG data may be stored first in memory on the motherboard before going to the recoder farm 156 is the recoder chip that is to process the particular MPEG transport stream may be busy with other data and not yet ready to receive new data.

The cherrypicker switches are typically expansion cards for a conventional Intel microprocessor (or other microprocessor) based motherboard which controls the operation of the cherrypicker switches and does other functions to be discussed above and below.

Figure 9:
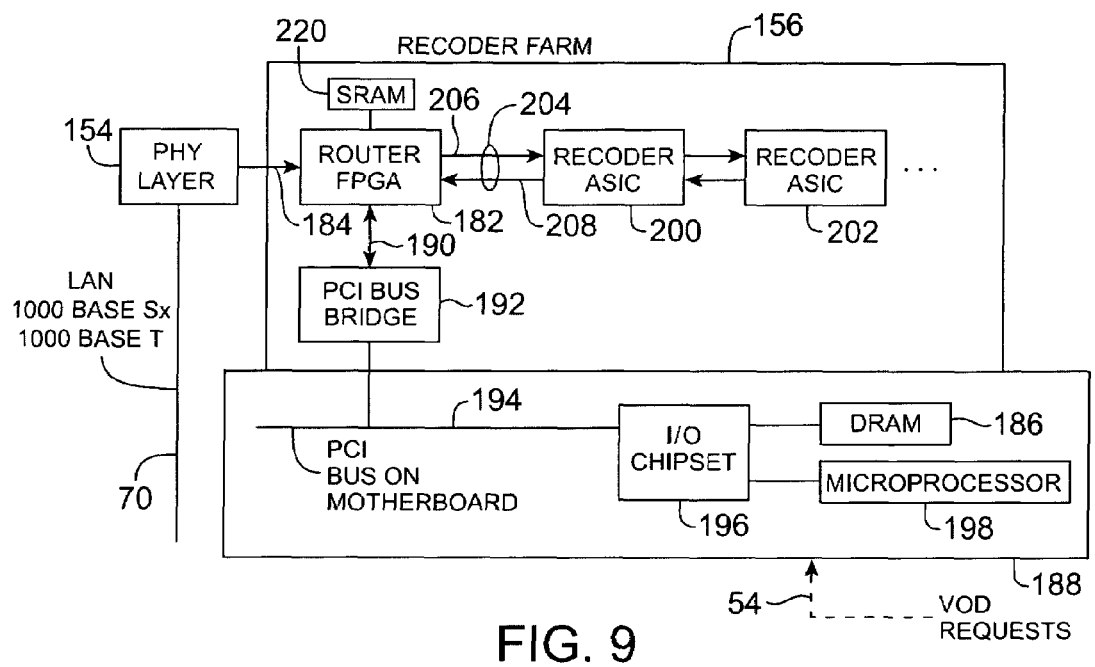
FIG. 9 is a block diagram of the recoder farm 156 in FIG. 8.

The recoder farm 156 is comprised of one or more recoder integrated circuits which function to receive MPEG data having a certain bandwidth and alter the bandwidth in accordance with bandwidth control commands received at a port 164. These recoder chips can be structured in accordance with the teachings of U.S. Pat. No. 5,956,088 which is hereby incorporated by reference and are commercially available from Terayon Communications Systems, Inc. of Santa Clara, Calif. FIG. 9 gives more details of the circuitry of the recoder farm 156.

Typically the bandwidth control commands are sent from the motherboard computer in accordance with the downstream data paths being used and the particular customer to which the data is being sent and the particular process at the customer premises to which the data is being sent. In some embodiments, all customers have simple installations which have one or more tuners which can recover digital data transmitted at a fixed bandwidth. In these embodiments, the bandwidth control commands simply specify each MPEG transport stream going to such a customer be re-compressed down to the bandwidth available on the downstream link to that customer. In other embodiments each customer may have a different available downstream bandwidth based upon the amount the customer paid for a subscription. In these embodiments, the available bandwidth for each MPEG transport stream directed to each customer is looked up in a look-up table and an appropriate bandwidth control command is sent. In other embodiments, especially those with UDP/IP connectivity all the way to all customer processes, each customer will have a different available bandwidth on their LAN which is reported upstream to computer 44 in an upstream management and control message from time to time and recorded in a look-up table entry for that customer. In addition, certain processes at that customer's premises may have different bandwidth capabilities which are specified with each upstream VOD request from that process. For example, an HDTV's settop decoder may have a large available bandwidth which is supported both by that customer's gateway and LAN and which is reported with VOD requests from that settop decoder. That customer may also have an intelligent remote with its own low resolution liquid crystal display which is used to preview channels before actually making a VOD request for the program. The process that drives that display will have a much lower maximum bandwidth capability, and that bandwidth capability will be reported with upstream VOD requests from that remote control. Thus, the lookup table for that customer will have one entry for the HDTV that reports a large maximum bandwidth capability for packets directed to the port owned by the settop decoder for the HDTV, and another entry for the remote reporting a much lower maximum bandwidth. Computer 44 will look up the maximum bandwidth available for transport streams directed to these two different UDP port addresses and generate appropriate bandwidth control messages on line 164 for the recoder chips that are processing those transport streams.

The recoder chips also receive feedback data on path 166 from a splicing and packet scheduling circuit 168. The purpose of this feedback is to control the recoder chips to throttle back their output bandwidth at appropriate times in the transmitted program so as to maintain a constant data rate output. MPEG data has a variable bandwidth that depends upon how much change there is from one frame to another. Thus, a car chase scene will have a much higher bandwidth after compression than a scene with two talking heads. Feedback on line 166 throttles back the recoder chips during high bandwidth times in the program to maintain a relatively constant transmitted bandwidth. The splicing and packet scheduling processes are the same processes as done in the prior art cherrypickers designed by Imedia, but they are positioned differently. In the prior art design, the splicing process was in front of the recoding farm 156 and had to work at the higher bandwidth rate of the MPEG data there. There also needed to be a high speed link between the splicing process and the packet scheduling process on the low bandwidth side. In the design of FIG. 8, the splicing and packet scheduling processes are done at the same point in the data flow and that point is on the lower bandwidth side of the recoder farm. That allows both processes to work at the lower bandwidth rate.

Input buffer 172 is preferably implemented in software on the motherboard, and serves to store the compressed MPEG output data from the recoder farm.

A classifier process 174 looks at the PIDs and the multiplex number (the input wire number) of each packet in each MPEG transport stream and corrects the time references therein. Each MPEG transport stream has timestamps included therein in the adaptation_field and PES_packet high level protocol data units. These timestamps are called program_clock_reference (PCR) fields and are used to synchronize the clock in the decoder that decompresses the data and generates video and audio signals. The classifier process forms a linked list that define the order for the bytes of video, audio and associated data for every program delivered in every transport stream. These linked list data structures are shown generally at 176. The classifier process also looks at the program_clock_references of every program stream and performs the following functions: (1) it establishes a mathematical relationship that defines the slip between the source encoder clock of the video server or other source and a clock in the cherrypicker; and (2) it changes the program_clock__references in the output MPEG transport streams from the cherrypicker to correct for the slip between the source encoder clock and a master clock of the cherrypicker switch. In other words, all incoming MPEG transport streams are re-clocked by the classifier to lock them in synchronization with a master clock 178 in the cherrypicker switch. The master clock 178 may be implemented as either a software clock in the motherboard or as an actual hardware clock.

A splicing and packet scheduling process 168 functions to monitor the timing constraints of each MPEG transport stream. It also functions to schedule deliveries of each packet of MPEG data to the settop decoder so as to satisfy the timing constraints of the MPEG transport stream specification and to prevent any underflow or overflow of the decoder buffer at the customer location to avoid gaps in the video or lost packets.

The output buffer 180 stores the outbound MPEG transport streams.

Referring to FIG. 9, there is shown a block diagram of the recoder farm 156 in FIG. 8. A physical layer 154 provides the network interface to LAN segment 70 which is typically 1000BaseSX or 1000BaseT Ethernet. A router circuit (preferably a field programmable gate array circuit) 182 functions to route the IP packets coming out of the Phy layer on path 184 either to the DRAM 186 on motherboard 188 via data path 190 and PCI bus bridge circuit 192 and PCI bus 194 or to the recoder circuit 200. The router 182 examines the PIDs of incoming IP packets and routes video MPEG packets to the recoder circuits 200 and 202 via path 204 (or to DRAM 186 for temporary storage if the recoder chips are not ready to receive new data yet). Incoming audio data, IP data from the internet or other iData that does not need compression to a lower bandwidth, and auxiliary table or graphic data to be displayed with a program is routed to DRAM 186 by router 182 in one embodiment to be processed by the multiplexing process being carried out by the microprocessor 198. Each MPEG packet has 8 bits in its header which indicates what type of data it is which may be used by the router. The router also filters out any Ethernet packets that contain managment and control data or Telnet text messages and routes them to the motherboard for appropriate processing. This allows remote management of the cherrypicker switches by Telnet or SNMP applications. To do this the router 182 stores these non-MPEG packets in static RAM 220 and informs the PCI bridge that they should be moved from the SRAM 220 to the motherboard as soon as practical but that they should be associated with the network device driver and not the MPEG packet processing process.

The router 182 also functions to receive MPEG transport streams assembled by the motherboard 188 and transmitted to it over the PCI bus 194 and packetizes them into IP packets. In embodiments where there is TCP/IP or UDP/IP connectivity all the way to the consuming process, the motherboard may send messages to the router instructing it as to what UDP port address and IP host address to use for each transport stream. The router then packetizes these IP packets in Ethernet packets addressed to the IP dewrapper 76 in FIG. 1 in embodiments where there is no UDP/IP connectivity to the consuming process. In embodiments where there is UDP/IP connectivity to the consuming process, the router addresses the Ethernet packets to the appropriate DSL modem or cable modem that will transmit the MPEG transport stream.

The motherboard 188 has a conventional input/output chipset 196 that interfaces the DRAM memory 186 and a microprocessor 198 to the PCI bus 194. The operation of the microprocessor is controlled by one or more operating system programs and various other protocol, routing, quality of service, packetization and other programs identified herein to carry out the functions discussed for the cherrypicker switches 30 and 32 discussed herein to control the bandwidth of data output by the cherrypicker multiplexers, assemble MPEG transport streams, receive upstream VOD request data, send PID filtering commands to said cherrypicker multiplexers, control where the MPEG transport streams are sent, and process management and control commands, etc. These programs can be read into DRAM 186 from a nonvolatile memory such as a hard disk (not shown) or from boot ROM, EEPROM or flash memory (also not shown).

A plurality of recoder ASICs 200 and 202 structured in accordance with the teachings of the Imedia patent incorporated by reference herein function to receive IP packets containing MPEG data, decompress them and then recompress the data to the available bandwidth designated by the microprocessor 198. The available bandwidth is specified via a control packet sent through PCI bus 194, PCI bridge 192, path 190, router 182 and data path 204 to the recoders.

One of the functions of the motherboard 188 is to tell the recoder chips which PIDs to process. The motherboard can receive upstream video on demand requests from upstream request processing computer 44 in FIG. 1 as Ethernet packets routed through packet switch 10 to the cherrypicker switch 30 through LAN segment 70. Alternatively, there may be a separate message data path shown as dotted line 54 which is dedicated to management and control traffic such as upstream VOD requests. This path 54 may be an in-band path on the LAN 70 or an out-of-band path on the LAN 70 or a completely separate physical data path from computer 44 to each cherrypicker switch 30, 32, etc.

The microprocessor 198 transmits messages to the recoder circuits 200 and 202 telling each which PIDs to pick off the stream of PIDs being circulated to all recoders on the outbound bus 206 (referred to in the claims as an outbound data path) and inbound bus 208 (referred to in the claims as an inbound data path) of data path 204.

The combined function of the recoders 200, 202 etc., the router 182 and the microprocessor and its controlling software and the associated circuitry is:

(1) to receive the IP packets,
(2) strip off the headers,
(3) determine which PIDs each recoder is to process,
(4) circulate all MPEG video packets to all recoders,
(5) pick off the appropriate PIDS in each recoder in accordance with messages from said computer 188 generated from upstream VOD requests or video programs to be broadcast,
(6) decompress the data at least partially and recompress it to a bandwidth specified by a message from microprocessor 198,
(7) re-packetize the MPEG data in each MPEG transport stream and add the appropriate addressing information for whichever of the embodiments discussed above is in use, and
(8) route the TCP/IP or UDP/IP packets back out LAN segment 70 to the appropriate destination for downstream transmission or output MPEG transport streams to the appropriate transmitter for transmission, depending upon the embodiment in use.

Figure 10:
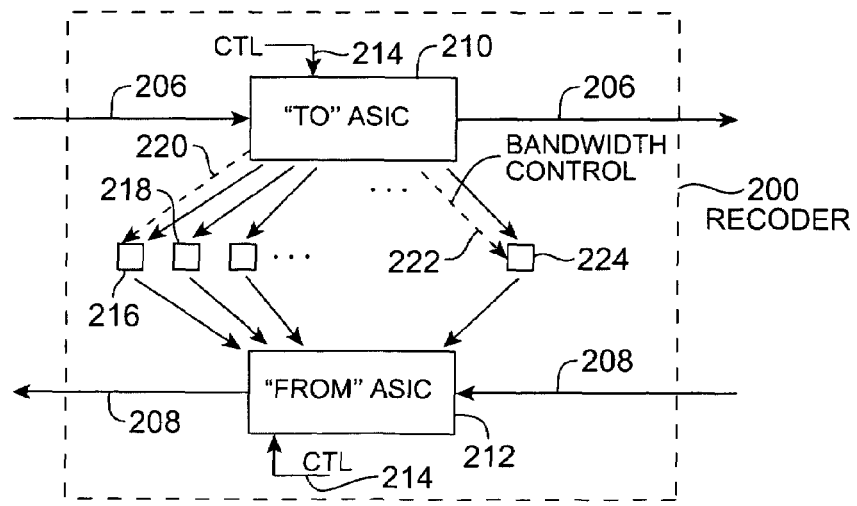
FIG. 10 is a block diagram of a recoder circuit such as recoder ASIC 200 in FIG. 9.

FIG. 10 is a block diagram of a recoder circuit such as recoder ASIC 200 in FIG. 9. Outbound bus 206 is an input and an output to a "to" circuit 210. The input of bus 206 brings all the circulating MPEG packets to ASIC 210, and the output bus 206 carries the MPEG packets not picked off by the "to" circuit 210 to the "to" circuit of the next recoder in the chain. The inbound bus 208 is an input to a "from" circuit 212 and is also an output therefrom to the next "from" circuit of the next recoder in the chain. This architecture makes the system easily expandable.

The "to" circuit 210 receives the messages from the motherboard indicating which PIDs it is supposed to pick out of the stream and makes a table. In some embodiments, the PIDs to pick are transmitted to the "to" circuit by a separate data path 214 from the motherboard to the "to" circuit. The control bus 214 is a 2-bit bus driven from slave registers (not shown) of the PCI bus bridge 192 that carries control messages from the motherboard 188 to all the "to" and "from" circuits. Inbound and outbound buses 206 and 208 are buses which are 66-MHz buses which are 16-bits wide and carry MPEG packet streams with tag signals or data that tell when each MPEG packet starts and stops.

The "to" circuit functions to compare the PID of every MPEG packet that passes to its table and pick off the ones that have a match. The "to" circuit also performs a buffer management function for the bandwidth altering recoder ASICs of which 216 and 218 are typical.

The video packets are processed by the recoder circuits 216, 218 etc. as follows. When an MPEG packet with a PID that matches an entry in the table in "to" circuit 210 arrives, it is both copied into SRAM 220 and retransmitted out on bus 206. A message is sent to an assigned one of the recoders 216 etc. on a handshake line (not shown) which says, "I have data for you". The recoders send back messages to the "to" circuit on another handshake line (or on the data path itself) when they are ready to receive a new burst of data. The "to" circuit then retrieves the packet from SRAM 220, strips off the MPEG header, and sends it to the recoder for "crunching". Each recoder 216 etc. has a control port (not shown) which can receive various commands. One of these commands is how much bandwidth crunching to do. This command is given to each recoder based on commands received on control bus 214 and depends upon the particular PID and the available bandwidth of the downstream path for the MPEG transport stream to the requesting process and the bandwidth capability of the requesting process itself. These bandwidth commands are represented as dashed lines to recoders 216 and 224, but individual commands go to each recoder. The recoder chips have been in public use for 1.5 years and are commercially available and are described in the U.S. patent incorporated by reference herein.

The "from" circuit 212 also does a PID picking function, but it picks off PIDs for audio, auxiliary data and IP packet data from the internet that are in residue MPEG packets entering on bus 208. By the time the MPEG packet data on bus 206 has passed through the last "to" circuit in the chain, all the video PIDs have been picked off, and the data is turned around and coupled onto bus 208. At this point, the only MPEG packets left are audio, auxiliary data and IP packet data from the internet or voice or IP packets. Although we stated earlier that the router 182 in FIG. 9 sends all these packets to the motherboard 188, that only represents one embodiment. The preferred embodiment is to do this routing in a distributed fashion and use the "from" circuits to do part of the work for the router to keep from overwhelming it. The particular audio, data or IP packet PIDs that get picked off by each "from" circuit are specifed to each "from" circuit by a control message from the motherboard. The "from" circuit also sets a "magic" bit (referred to in the claims as a marker bit) in the header of each MPEG packet containing audio, auxiliary data or IP internet data it picks off bus 208 and transmits the packet back toward router 182 on bus 208.

In addition, the "from" circuit receives MPEG 2 compressed data bits of an elementary stream from each of the recoders 216, 218, etc. and packetizes them into MPEG packets. Each such video packet is given a PID as assigned by the motherboard in a control message. The "from" circuit maintains a PID table built from control messages that indicates what PID is to be assigned to MPEG packets built from the output bits of each recoder 216, etc. Each recoder has its own output line to the "from" circuit, and that output line number is used as an index into the PID table to determine which PID to put into the MPEG packet constructed from data from that recoder. The PID put into the packets constructed by the "from" circuit will normally be the same PID the data originally had, but it can be different also to allow for cable plant operators to remap their PIDs.

The "from" circuit also marks each such MPEG packet it constructs from the elementary video data from the recoders with a "magic" bit. This "magic" bit in each MPEG video, audio, auxiliary data or IP data packet or iData packet acts as a flag to router 182 to cause it to route that packet to the motherboard 188. Each video, audio, auxiliary data and IP data packet or iData packet has its own unique PID in addition to the magic bit. All packets marked with the magic bit coming in on bus 208 are routed to the computer 188 for assembly into TCP/IP or UDP/IP packets or MPEG transport streams.

The motherboard functions to receive all these packets marked with a "magic" bit and sort them by PID into the various MPEG transport streams that the motherboard creates and which are going to be sent to various users containing their VOD and internet and other services requests. Where necessary, the motherboard also generates downstream messages that will be sent to each customer telling that customer which logical channel to tune and the subchannel or assigned PID to monitor to recover the requested data. Pushed or broadcast data is treated the same way except it will usually be transmitted on the same logical channel and subchannel at all times. However, in embodiments where load balancing is in effect, the cherrypicker switches may shuffle broadcast channels around if necessary to make room on a logical channel to transmit all programs requested by a customer with a limited number of tuners to that customer on a number of logical channels that does not exceed the number of tuners the customer has. Where broadcast or other VOD programs are shifted around to make room in a load balancing action, the motherboard will also send downstream messages to all affected customers tuned to the programs that have been moved telling them where to look for the programs and services they were using after the shift.

There are three different embodiments for the transmission of non MPEG video program data represented by FIG. 1. These three embodiments differ in how upstream and downstream data from the web server 22 and the application server 25, i.e., iData, are routed and transmitted. The differences in routing will be specified in the flowcharts of FIGS. 11, 12 and 13. Specifically, the three embodiments basically differ in how iData and command and control data is routed and transmitted downstream to the customers. Video program data is always transmitted downstream using the cherrypicker multiplexers, and, in some embodiments, an IP dewrapper circuit 76 in all three embodiments.

In the first embodiment, the TCP/IP or UDP/IP packets of iData and command and control messages are routed to and sent downstream via modem 46 and any downstream physical data path 29 (HFC, DSL or satellite). Simultaneously, or in upstream transmission time intervals if the transmission data paths 29 and 50 are shared and half duplex), upstream iData requests and commands and requests for VOD are received by the modem 46 via any upstream path 50. Upstream data path may be the same as downstream data path 29, and may use any form of multiplexing to keep upstream and downstream transmissions separated.

In the first embodiment, the upstream VOD and iData requests and commands are packetized in LAN packets and transmitted to computer 44 which sends messages to the appropriate video servers telling them what video programs to output and passes iData requests and commands along to the appropriate web server or application server to act upon depending upon user privileges and subscriptions. Further, computer 44 instructs packet switch router 44 to route iData and video program data according to the first embodiment scheme described herein. The command and control computer 44 compares each iData request and command and VOD request to information regarding the privileges and subscriptions of the customer who made the request and command and only sends messages to the appropriate server if the customer is entitled to receive what he or she requested. The computer 44 also does billing processing or sends messages to a separate billing computer (not shown) to bill the customer for the request, deduct the cost of the request from a credit card or deposit account, etc. The computer 44 also sends messages to the appropriate network cherrypicker multiplexer via path 52 and the packet switch or path 54 telling it which of its customers has requested what iData and/or video programs and what PIDs the requested data will have when it arrives in LAN packets from packet switch 10. The computer 44 also, optionally, does load balancing to examine how many requests have been made by each customer, how many tuners that customer has and which logical channels have capacity to send the requested data. The load balancing attempts to get all the requested data onto a number of logical channels that do not exceed the number of tuners the customer has. Computer 44 also generates downstream command and control messages to be sent to customers telling them which logical channels the requested iData and/or video program data will be on and which PIDs the requested data will have so that the requested data may be filtered out by the customer's receiver(s). Shuffling of data already being sent to other customers on certain logical channels and/or PIDs may occur in some embodiments to accomodate customers with a limited number of tuners. In such embodiments, new downstream messages will be sent to customers already receiving iData or video data telling their tuners to which logical channels to tune to continue to receive the requested data and which PIDs it will have.

In the first embodiment cherrypicker multiplexers transmit only MPEG video program data for video-on-demand and pushed or broadcast data and any associated auxiliary data. In this embodiment, iData is output as LAN packets addressed to modem 46 by the one or more web servers 22 and the one or more application servers 25. Packet switch 10 routes these LAN packets to modem 46 via LAN segment 31.

The modem 46 strips off the LAN packet headers and sends the encapsulated TCP/IP or UDP/IP iData packets downstream via downstream physical data path 29. If modem 46 is a cable modem, it can be any type of cable modem, but is preferably DOCSIS compliant. If cable modem 46 is DOCSIS compliant, the incoming iData packets are encapsulated in MPEG packets and transmitted over the HFC 29. Other types of downstream circuitry for modem 46 may also be used to, for example, encapsulate the iData packets into ATM cells or transmit the iData packets directly by interleaving the data of the iData packets, and modulating it onto a downstream carrier and using any form of multiplexing to keep it separate from other data addressed to different users and command and control messages. Downstream command and control messages are also sent via modem 46 to tell customers the logical channels and PIDs on which broadcast and requested video programs are being transmitted. Suitable cable modems to do this are commercially available from several sources. Upstream requests for VOD selections and upstream iData are sent to modem 46 over upstream data path 50 and are output as LAN packets encapsulating TCP/IP or UDP/IP packets addressed to the appropriate host and process. For example, upstream VOD requests are encapsulated in LAN packets encapsulating TCP/IP or UDP/IP packets addressed to computer 44. On the other hand, upstream iData commands, menu selections and other data are encapsulated in LAN packets encapsulating TCP/IP or UDP/IP packets addressed to the appropriate web server 22 or application server 25. Both sets of LAN packets are transmitted to packet switch 10 over LAN link 31 and are routed to the appropriate host in the headend equipment, as described above.

The second embodiment for transmitting iData represented by FIG. 1 uses the modem 46 to receive upstream video-on-demand requests and requests for iData, and to transmit downstream command and control messages. These downstream command and control messages include messages that tell customers which logical channels and PIDs to use in finding the VOD and iData they requested. The command and control computer 44 does the same things it did in the first embodiment and transmits downstream messages via modem 46. Downstream iData and video-on-demand program data is transmitted in the MPEG transport streams generated by the cherrypicker multiplexers 30, 32 etc. In this embodiment, the iData output by the one or more web servers 22 and the one or more application servers 25 is TCP/IP or UDP/IP packets addressed to the particular host at the customer site and process port on that host which requested the iData. These packets are encapsulated into LAN packets addressed to the particular cherrypicker switch 30, 32 which serves the customer which requested the iData. The packet switch routes these iData packets to the appropriate cherrypicker switch, which then encapsulates them into MPEG packets in one or more MPEG transport streams to be sent to the customer which requested the iData. In some embodiments, the cherrypicker switches compress the iData packets down to the appropriate bandwidth for delivery over the downstream data path being used by the cherrypicker switch or the modem or transmitter coupled to receive the MPEG transport streams from the IP dewrapper circuit 76. The video-on-demand MPEG data is processed and transmitted downstream by the cherrypicker multiplexers as described herein.

The third embodiment represented by FIG. 1 uses modem 56 for upstream video-on-demand requests and upstream iData requests and commands only. The upstream iData and VOD requests and commands are packetized and sent to computer 44 which processes them as above described for the first embodiment. Downstream messages however are sent to the appropriate cherrypicker multiplexers for transmission in the MPEG transport streams to the appropriate customers. The computer 44 sends messages to the web servers and application servers telling them what PIDs to assign to the iData when it is encapsulated into MPEG packets which are encapsulated into TCP/IP or UDP/IP packets and LAN packets and given multicast addresses. In this embodiment, the multicast addresses are generated as is the case for video program data. Further, computer 44 instructs packet switch router 44 to route iData and video program data according to their PIDs to the appropriate cherrypicker multiplexers which are generating the MPEG transport stream for the customer to which the iData and video data is bound. The computer also sends messages to the cherrypicker multiplexers telling them which PIDs various iData and video program data will have and which customers requested the iData and video program data. The cherrypicker multiplexers then use the assigned PIDs in the incoming LAN packets to put the iData and video program data into the correct MPEG transport stream for transmission to the customer which requested it. In some embodiments there will be TCP/IP or UDP/IP connectivity all the way to the host and process at the customer which requested iData or video data. In such embodiments, the messages from the computer 44 to the VOD servers or their IP wrapper circuits, web servers and application servers instruct them to packetize the requested data into TCP/IP or UDP/IP packets addressed to the host and process at the customer location and encapsulate these packets in LAN packets addressed to the particular cherrypicker multiplexer which will transmit the data to the customer which requested it. The packet switch then routes these LAN packets to the appropriate cherrypicker multiplexer, or multicasts the LAN packets to all of them if the LAN packets have a multicast address. The cherrypicker multiplexer then strips off the LAN packet headers and examines the TCP/IP or UDP/IP destination address to determine whether the packet is addressed to a customer that cherrypicker multiplexer serves. Then, in some embodiments, the cherrypicker switch adjusts the bandwidth of the video data to the available downstream bandwidth or the bandwidth of the receiving process. The cherrypicker switch may also then adjust the bandwidth of the iData, if necessary per the type of data being transmitted or the bandwidth of the destination process or the bandwidth of the downstream channel. The altered bandwidth video data and iData is then repacketized in TCP/IP or UDP/IP packets addressed to the host and process at the customer location that requested it. The TCP/IP or UDP/IP packets are then simply sent from the cherrypicker multiplexer to the downstream transmitter for transmission on the appropriate logical channel. At the transmitter, the packet data is interleaved and different packets destined for different customers are multiplexed if necessary to keep them separate from each other. Downstream command and control messages are sent by computer 44 to the customers as TCP/IP or UDP/IP packets telling them which logical channels to tune to receive the requested data.

In the third subgenus of embodiments where there is no TCP/IP connectivity all the way to the customer, all downstream iData, command and control messages and MPEG video program data is encapsulated in MPEG packets. Each video program has a unique PID and iData destined to a particular host and process at the customer is assigned a PID that does not conflict with the video program data. This PID is assigned by the computer 44 via a message to the server which outputs the data. The server then encapsulates the TCP/IP or UDP/IP packets of the iData in MPEG packets and assigns the appropriate PID. The MPEG packet is then encapsulated in a LAN packet addressed to the particular cherrypicker multiplexer which serves the customer at the location identified in the TCP/IP header destination address. This information as to which cherrypicker multiplexer to send the MPEG packets of iData to is given to the server by the computer 44. In alternative embodiments, the LAN packets may be multicast, and the computer 44 tells the cherrypicker multiplexers which video and iData packets to filter out from the multicast by PID. The cherrypicker multiplexers then depacketize down to the enclosed the iData and/or video program data and sort the iData into the proper MPEG transport stream to be sent to the customer to which it is addressed, as indicated by the TCP/IP address header information or the PID in the MPEG packet header. Optionally, the bandwidth of the iData may be adjusted downward if necessary. The cherrypicker multiplexers then each generate one or more MPEG transport streams that will be transmitted on one or more logical channels to the particular customers that made the requests, and supplies each transport stream to the appropriate transmitter or modem that will transmit it on the logical channel assigned by computer 44. The computer 44 may, optionally, do a load balancing process. Downstream messages are generated by the computer 44 telling each customer where to tune to receive the requested iData and video program data. These downstream messages are sent as TCP/IP or UDP/IP packets addressed to the customer process which must do the tuning, and are encapsulated in MPEG packet encapsulated in LAN packets addressed to the appropriate cherrypicker multiplexer. The packet switch then routes them to the appropriate cherrypicker multiplexer where they are included in the transport stream going to that customer.

Figure 11:
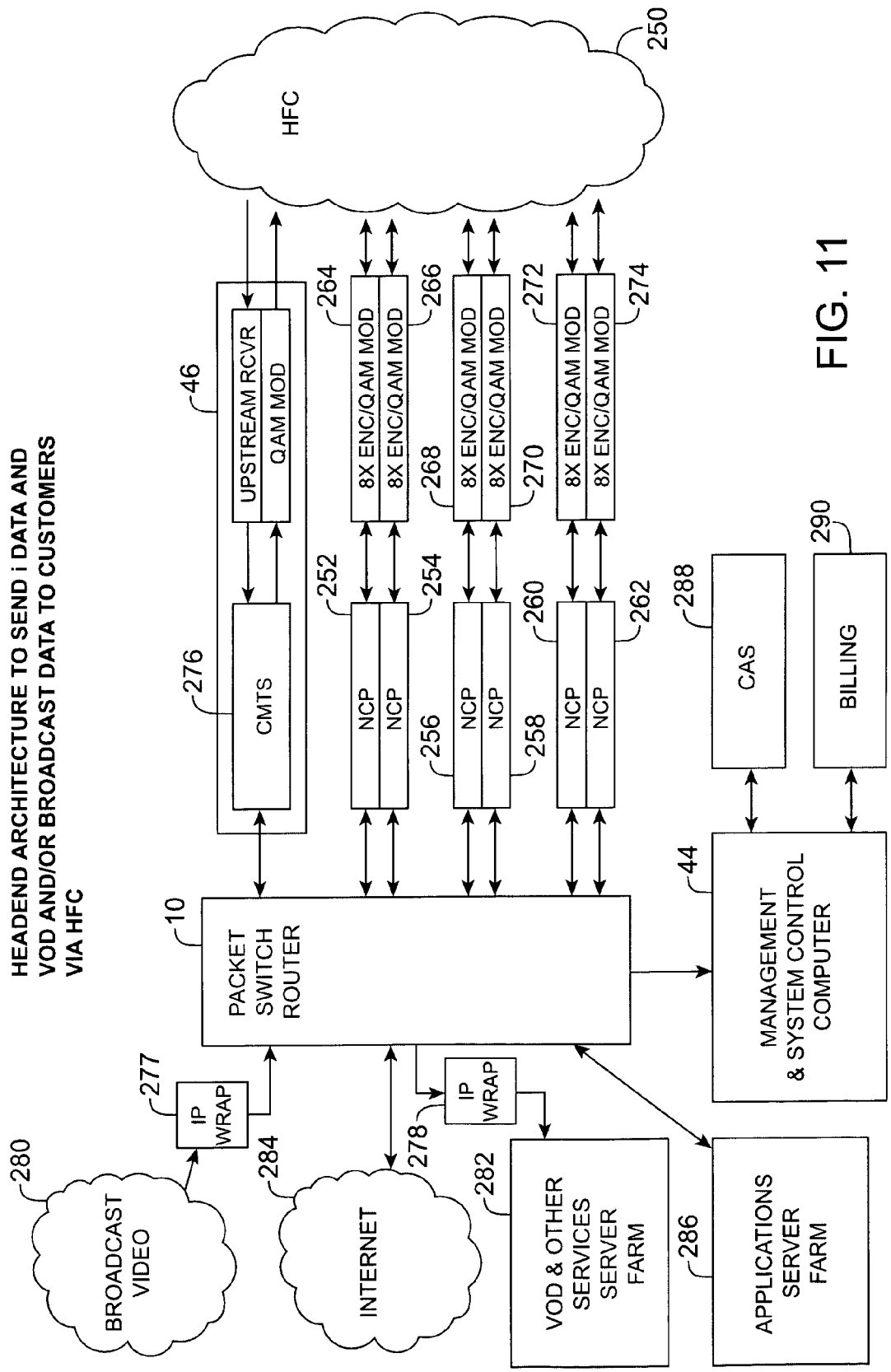
FIG. 11 is a block diagram of the preferred architecuture for a cable headend to deliver iData and VOD and/or broadcast or pushed video programs to customers via HFC.

Referring to FIG. 11, there is shown a block diagram of the preferred architecuture for a cable headend to deliver iData and VOD and/or broadcast or pushed video programs to customers via HFC. The downstream and upstream path to the customers is a shared hybrid fiber coax (HFC) cable plant 250. A plurality of network cherrypicker multiplexers 252 through through 262 marked NCP have the same structure as defined herein. Cable modem 46 comprised of an upstream receiver and a downstream QAM modulated transmitter receives upstream VOD requests and upstream iData. The cable modem also transmits command and control messages and/or iData downstream in some embodiments. In other embodiments, the command and control messages and/or iData is transmitted downstream via the cherrypickers and their associated downstream cable modems marked 264 through 274. In some embodiments, the cable modem is used also to transmit and receive voice-over-IP packets.

The cable modem 46 can be any conventional cable modem design and many different types are commercially available. The preferred embodiment for the cable modem is defined in EPO patent publication 0955742 published 10 Nov. 1999 or EPO patent publication 0858695 published 19 Aug. 1998, both of which are hereby incorporated by reference.

A CMTS 276 is conventionally designed circuitry that, for the preferred embodiment, does all the interleaving, insertion of time stamps, ranging, training, adaptation of receiver amplitude and phase correction factors from preamble data etc. needed to support the receiver and transmitter of the cable modem.

A conventional packet switch router routes LAN packets on LAN links to the cable modem 46 and all the cherrypickers as previously described in the discussion of FIG. 1. The packet switch router is coupled by LAN links to multiple sources of packets. MPEG video data encapsulated in UDP/IP packets encapsulated in LAN packets addressed as previously described are supplied from IP wrapper circuits 277 and 278. IP wrapper 277 encapsulates MPEG packets from MPEG transport streams supplied from broadcast sources such as satellites and other cable system headends, as represented by cloud 280. IP wrapper circuit 278 supplies LAN packets encapsulating MPEG video packets and other TCP/IP packets supplied from VOD, near VOD and personal video recording servers and other types of servers in server farm 282. Near video on demand servers are servers that broadcast pay-per-view video programs on a frequent basis, usually the same movie over and over, and personal video recording servers are TIVO servers at the head end that record video programs requested by users in upstream requests and perform the other TIVO functions such that each customer can have a personal TIVO space at the head end with the TIVO functionality implemented by shared harware and software. The other types of servers in the server farm can include: EMM servers that supply auxiliary data for video programs, weather, new, stock reports, traffic information and other useful data; EPG servers that serve up electronic program guide data; web servers that convert HTML packets from the web servers in internet cloud 284 or from web servers in the server farm 282 to MPEG or other data formats so that users without computers can surf the web using their TVs and wireless keyboards or wireless remotes or other devices; Tmail servers that convert e-mail messages to MPEG or other video data that can be converted to a video signal that can be displayed on a user's TV to allow the user to send and receive e-mail using their TVs and using wireless keyboards or wireless remotes; data carousel servers that serve up data similar to teletext messages; and transcoder servers that transform streaming video and streaming audio TCP/IP packet streams into MPEG 2 transport streams and convert MPEG 1 transport streams to MPEG 2 transport streams, and convert quicktime and real player formatted data in TCP/IP packets to MPEG 2 transport streams.

The packet switch router 10 also receives LAN packets encapsulating TCP/IP packets from web servers in internet cloud 284 and from applications servers in application server farm 286. The web servers allow users at home or in the office with their computers to have internet access through the HFC plant 250 at much higher speeds than dial up connections to ISPs.

The application server farm can include: advertising servers that send advertisements out to customers via MPEG transport streams or TCP/IP streaming audio or video or other formats; Tcom servers that send and receive packets that allow customers to carry out telephone or videophone communications from their computers or televisions using wireless keyboards or wireless remotes and interface to the public service telephone network or high bandwidth services like T1, partial T1, frame relay or point to point networks and share the capacity thereof through the head end; game servers that send and receive packets that allow customers to play games on the game server at the head end remotely from their computers or televisions at home; chat servers that allow customers to enter chat rooms on the internet or local chat rooms restricted to the customers of the cable system; statistical servers that serve up any kind of statistical information; security servers that send and receive packets that carry MPEG video data from security cameras in user's homes or offices that can be viewed by security service personal at the head end; banking servers that allow customers to carry out electronic banking from their computers or televisions at home.

A management and system control computer 44 functions to control and coordinate operations within the head end to supply the above mentioned services. In addition to the functions mentioned for computer 44 in FIG. 1 in routing VOD requests and sending messages to implement VOD and control the bandwidth of the recompression processing in the cherrypicker multiplexers, computer 44 also functions to: manage subscribers to verify subscribers are authorized to receive what they have requested and send encryption key messages to the transmitters of the cable modem and cherrypicker transmitters to encrypt iData and video program data that customers have ordered so only they can view it or use it; provisioning and directory management; network management such as load balancing; reporting and analysis for management purposes; data management; and call center and customer operations support. In addition, computer 44 coordinates with CAS and billing systems 288 290.

Figure 12:
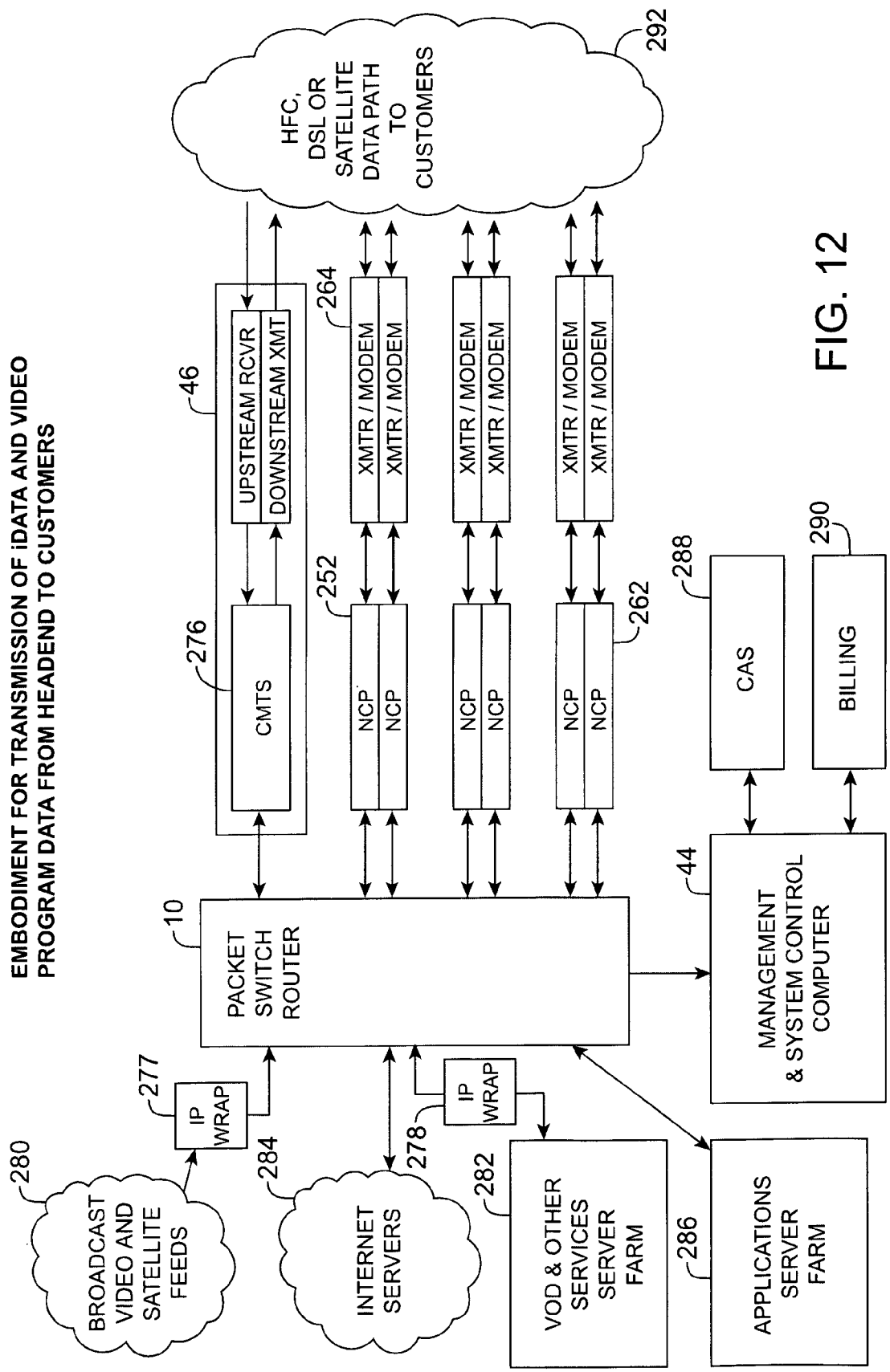
FIG. 12 is a block diagram of a more generalized architecuture for a cable headend, central office, satellite uplink facility to deliver iData and VOD and/or broadcast video data to customers via HFC, DSL or satellite.

FIG. 12 is a block diagram of a more generalized architecuture for a cable headend, central office, satellite uplink facility to deliver iData and VOD and/or broadcast video data to customers via HFC, DSL or satellite. All the functions and services provided are the same as described for FIG. 11, but the transmitters or modems are selected to match the particular type of medium or mediums that are being used for upstream and downstream communications. For example, if the cherrypickers are coupled to DSL lines, their transmitters 264 etc. are DSL modems. If the medium 292 is HFC, then the transmitters 264 etc. are cable modems. If the medium 292 is satellite uplinks and downlinks, then the transmitters 264 are satellite uplink transmitters, and modem 46 is a satellite transceiver with LAN packet inputs and microwave RF transmit and receive capability.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus comprising:
an IP wrapper circuit;
a packet switch;
one or more cherrypicker multiplexers; and
a local area network coupling said IP wrapper to said packet switch and coupling said packet switch to said one or more cherrypicker multiplexers,
wherein said cherrypicker multiplexers and said packet switch cooperate to receive data indicating video programs to be transmitted downstream to customers over DSL lines, cable television hybrid fiber coaxial cable networks or satellite downlinks and to receive MPEG data encapsulated in IP packet which are encapsulated in local area network packets from said IP wrapper circuit and to pick out only the MPEG packets containing data encoding the video programs which are to be transmitted and assemble said MPEG packets into MPEG transport streams.

2. An apparatus comprising:
an IP wrapper circuit;
a packet switch;
one or more cherrypicker multiplexers; and
a local area network coupling said IP wrapper to said packet switch and coupling said packet switch to said one or more cherrypicker multiplexers,
wherein said cherrypicker multiplexers and said packet switch cooperate to receive data indicating video programs to be transmitted downstream to customers over DSL lines, cable television hybrid fiber coaxial cable networks or satellite downlinks and to receive MPEG data encapsulated in IP packet which are encapsulated in local area network packets from said IP wrapper circuit and to pick out only the MPEG packets containing data encoding the video programs which are to be transmitted and assemble said MPEG packets into MPEG transport streams, and wherein said cherrypicker multiplexers further comprise circuitry to adjust the bandwidth of the MPEG transport streams so generated to match the available bandwidth to transport or process the data of said program(s).

3. An apparatus comprising:
one or more video servers that output MPEG transport streams;
one or more satellite feeds that output MPEG transport streams;
an IP wrapper circuit coupled to said one or more video servers and said one or more satellite feeds;
a packet switch;
one or more cherrypicker multiplexers; and
a local area network coupling said IP wrapper circuit to said packet switch and coupling packet switch to said one or more cherrypicker multiplexers;
means for receiving upstream requests for video-on-demand programs and sending data to said cherrypicker multiplexers which identify the requested programs; and
means for sending data to said one or more video servers or satellite feeds or both said video servers or satellite feeds identifying which video program data should be sent to said cherry picker multiplexers through said IP wrapper circuit, said local area network and said packet switch for assembly into MPEG transport streams for transmission to customers which made said upstream requests.

4. An apparatus comprising:
one or more video servers that output MPEG transport streams;
one or more satellite feeds that output MPEG transport streams;
one or more web servers;
any one or more other types of servers on which applications programs may be run remotely from customer sites;

an IP wrapper circuit coupled to said one or more video servers and said one or more satellite feeds;

a packet switch coupled to said one or more web servers and said any one or more other types of servers;

one or more cherrypicker multiplexers;

a local area network coupling said IP wrapper to said packet switch and coupling said packet switch to said one or more cherrypicker multiplexers; and upstream channel means for receiving upstream requests from customers for video programs and requests or commands to obtain data from the Internet via said web server or execute application programs on said other servers, and for identifying the requested video programs to the appropriate one or more of said video servers or satellite feeds or both and to send said request for data and commands to one or more web server or any other types of server which can supply said and wherein said requested data or execute said command;

and wherein said IP wrapper circuit and said packet switch cooperate to packetize said requested video program data appropriately and route said packetized video data and other requested data output by said one or more web servers and said any one or more other types of servers to the appropriate one or more means for transmission to the one or more customers who requested said data.

5. The apparatus of claim 4 wherein said cherrypicker multiplexers further comprise means for adjusting the bandwidth of data to be sent to customers to lesser bandwidths if necessary.

6. An apparatus comprising:

an IP wrapper circuit for receiving MPEG transport streams on one or more inputs, each said MPEG transport stream comprised of a plurality of MPEG packets, each MPEG packet having a program identification code (hereafter a PID) and mapping said PIDs and input number for each MPEG packet in each said transport stream into an IP packet header multicast destination address and encapsulating one or more of said MPEG packets having the same PID and input number into an IP packet and encapsulating each IP packet into a LAN packet having an LAN packet destination address which is a multicast:address but which is unique to the PID and input number of the MPEG packets enclosed therein;

a local area network coupled to said IP wrapper circuit;

a packet switch coupled to said IP wrapper circuit via said local area network;

one or more cherrypicker multiplexers coupled to said packet switch via said local area network, each functioning to receive data defining which programs have been requested by one or more customers or which is to be transmitted regardless of requests for it and generating and transmitting to said packet switch one or more packets identifying by LAN packet destination address the LAN packets said packet switch is to route to said cherrypicker multiplexer, and for receiving from said packet switch the requested LAN packets encapsulating MPEG data and assembling MPEG transport streams that are to be sent to said customers containing data encoding the programs which have been requested or which are to be transmitted regardless of request, and encapsulating MPEG packets from said transport streams into UDP/IP or TCP/IP packets.

7. The apparatus of claim 6 further comprising an IP dewrapper circuit coupled to said cherrypiohernlu0p!exanathrough said packet switch and said local area network and functioning to receive LAN packets encapsulating UDP/IP or TCP/IP packets which encapsulate at least MPEG packet data and which are addressed to said IP dewrapper circuit said IP dewrapper circuit functioning to strip off the LAN packet header and UDP/IP or TCP/IP packet header and output a pure MPEG transport stream, and wherein said cherrypicker multiplexers function to encapsulate the UDP/IP or TCP/IP packets they generate in LAN packets addressed to said IP dewrapper circuit and transmit them over said local area network to said packet switch.

8. The apparatus of claim 6 further comprising dedicated data paths from each said cherrypicker multiplexer to one or more DSL modems or cable modems or satellite uplink facilities.

9. The apparatus of claim 6 further comprising a second local or wide area network of a different type than the type of local area network coupled to said packet switch, said second local or wide area network, coupling said cherrypicker multiplexers to one or more DSL modems or cable modems or satellite uplink facilities.

10. The apparatus of claim 6 further comprising means for receiving upstream requests for video-on-demand programs or other TCP/IP packetized data from the internet or other sources and for transmitting those requests to said cherrypicker multiplexers.

11. The apparatus of claim 10 wherein said cherrypicker multiplexers convert said requests to particular PIDs and input number, and generate and send to said packet switch LAN packets identifying the particular LAN packets by LAN destination address which will carry the data requested in the upstream request.

12. The apparatus of claim 11 wherein said packet switch further functions to receive said LAN packets identifying LAN packets to be routed to said cherrypicker multiplexers and generates and sends messages to the appropriate source of the requested data requesting that the requested data be sent to said packet switch.

13. The apparatus of claim 6 further comprising a web server coupled to the internet and a local area network connection between said mob server and said packet switch.

14. The apparatus of claim 6 further comprising a wide area network data path between said packet switch and one or more other cable system headends or DSL central offices or satellite uplink facilities such that requested data may be received from said one or more other cable system headends or DSL central offices or satellite uplink facilities.

15. An apparatus comprising:

one or more video servers or satellite uplink/downlink circuitry or both that output MPEG transport streams encoding one or more video programs, each MPEG transport stream comprised of a plurality of MPEG packets each having a program identification code (hereafter PID);

an IP wrapper circuit for receiving MPEG transport streams on one or more inputs coupled to said one or more video servers or satellite receivers or both said video servers and satellite receivers, and mapping said PIDs and input number for each MPEG packet in each said transport stream into an IP packet header multicast destination address and encapsulating one or more of said MPEG packets having the same PID and input number into an IP packet and encapsulating each IP packet into a LAN packet having an LAN packet destination address which is a multicast address but which is unique to the PID and input number of the MPEG packets enclosed therein;

a local area network coupled to said IP wrapper circuit;

a packet switch coupled to said IP wrapper circuit via said local area network;

one or more cherrypicker multiplexers coupled to said packet switch via said local area network, each functioning to receive data defining which programs have been requested by one or more customers or which is to be transmitted regardless of requests for it and generating and transmitting to said packet switch one or more packets identifying by LAN packet destination address the LAN packets said packet switch is to route to said cherrypicker multiplexer, and for receiving from said packet switch the requested LAN packets encapsulating MPEG data and assembling MPEG transport streams that are to be sent to said customers containing data encoding the programs which have been requested or which are to be transmitted regardless of request, and encapsulating MPEG packets from said transport streams into UDP/IP or TCP/IP addressed either packets to a host computer and a process on said host computer at a customer site to which said data is to be sent or addressed to an IP dewrapper circuit coupled by said local area network to said packet switch and which does not form part of the invention of this claim;

means for receiving upstream requests for video-on-demand programs or other TCP/IP packetized data from the internet or other sources and for transmitting those requests to said cherrypicker multiplexers;

and wherein said cherrypicker multiplexers convert said upstream requests to particular PIDs and input numbers, and generate and send to said packet switch LAN packets or other messages identifying the particular LAN packets to be routed to each said cherrypicker multiplexer by LAN destination address, said LAN packet to be routed to said cherrypicker multiplexers being ones which will carry the video programs and other data requested in the upstream requests;

and wherein said packet switch functions to receive said LAN packets or messages identifying the requested LAN packets and generates and sends LAN packets or other messages to said one or more video servers and/or satellite uplink/downlink circuitry requesting that the requested data be transmitted to said IP wrapper circuit.

16. The apparatus of claim 15 further comprising an IP dewrapper circuit coupled to said packet switch via said local area network and functioning to receive LAN packets encapsulating UDP/IP or TCP/IP packets encapsulating MPEG data and strip off said LAN packet header and said UDP/IP packet header and output a pure MPEG transport stream, and wherein said cherrypicker multiplexers address said UDP/IP or TCP/IP packets to said IP dewrapper circuit and further function to encapsulate said UDP/IP or TCP/IP packets into LAN packets addressed to said IP dewrapper circuit.

17. An apparatus comprising:
one or more video servers and/or satellite uplink/downlink circuitry that output MPEG transport streams encoding one or more video programs, each MPEG transport stream comprised of a plurality of MPEG packets each having a program identification code (hereafter PID);

one or more web servers coupled to the internet;

an IP wrapper circuit for receiving MPEG transport streams on one or more inputs coupled to said one or more video servers and/or satellite receivers, and mapping said PIDs and input number for each MPEG packet in each said transport stream into an IP packet header multicast destination address and encapsulating one or more of said MPEG packets having the same PID and input number into an IP packet and encapsulating each IP packet into a LAN packet having an LAN packet destination address which is a multicast address but which is unique to the PID and input number of the MPEG packets enclosed therein;

a local area network coupled to said IP wrapper circuit and said one or more web servers;

a packet switch coupled to said IP wrapper circuit and said one or more web servers via said local area network;

one or more cherrypicker multiplexers coupled to said packet switch via said local area network, each functioning to receive data defining which programs have been requested by one or more customers or which is to be transmitted regardless of requests for it and generating and transmitting to said packet switch one or more packets identifying by LAN packet destination address the LAN packets said packet switch is to route to said cherrypicker multiplexer, and for receiving from said packet switch the requested LAN packets encapsulating MPEG data and assembling MPEG transport streams that are to be sent to said customers containing data encoding the programs which have been requested or which are to be transmitted regardless of request, and encapsulating MPEG packets from said transport streams into UDP/IP or TCP/IP packets addressed either to a host computer and a process on said host computer at a customer site to which said data is to be sent or addressed to an IP dewrapper circuit coupled by said local area network to said packet switch and which does not form part of the invention of this claim;

means for receiving upstream requests for video-on-demand programs or other TCP/IP packetized data from the internet or other sources and for transmitting those requests to said cherrypicker multiplexers;

and wherein said cherrypicker multiplexers convert said upstream requests to particular PIDs and input numbers or any format suitable for communicating to the source of the requested data what data was requested, and generate and send to said packet switch LAN packets or other messages identifying the particular TCP/IP data encapsulated in LAN packets and/or LAN packets encapsulating video program data to be routed to each said cherrypicker multiplexer, said LAN packets being identified by LAN destination address, said LAN packet to be routed to said cherrypicker multiplexers being ones which will carry the video programs and/or other TCP/IP packetized data requested in said upstream requests;

and wherein said packet switch functions to receive said LAN packets or messages identifying the requested LAN packets and generates and sends LAN packets or other messages to said one or more video servers and/or satellite uplink/downlink circuitry requesting that the requested video data be transmitted to said IP wrapper circuit and that the requested TCP/IP data be transmitted to said packet switch, said packet switch functioning to receive LAN packets encapsulating the requested video and/or TCP/IP packetized data and route said LAN packets to the cherrypicker multiplexer that requested said data.

18. The apparatus of claim 17 further comprising an UP dewrapper circuit coupled to said packet switch via said local area network and functioning to receive LAN packets encapsulating UDP/IP or TCP/IP packets encapsulating MPEG data and strip off said LAN packet header and said UDP/IP packet header and output a pure MPEG transport stream, and wherein said cherrypicker multiplexers address said UDP/IP or TCP/IP packets to said IP dewrapper circuit and further function to encapsulate said UDP/IP or TCP/IP packets into LAN packets addressed to said IP dewrapper circuit.

19. A process for supplying video data to consumers, comprising the steps of:

(1) receiving one or more MPEG transport streams containing data encoding video programs to be transmitted to one or more consumers, each MPEG transport stream comprised of a plurality of MPEG packets each having a program identification code (hereafter PID);

(2) encapsulating one or more MPEG packets having the same PID from said transport streams in the payload portion of an internet protocol packet (hereafter referred to as an IP packet) and mapping the PID of the encapsulated MPEG packets into an IP multicast address used as the destination address of said IP packet;

(3) encapsulating each said IP packet in a local area network packet and mapping said IP packet multicast destination address into a multicast destination address for the local area network destination address which is unique for each PID;

(4) transmitting said local area network packets so generated over said local area network to a packet switch;

(5) receiving in said packet switch from each of said one or more cherrypicker multiplexers one or more local area network packets containing data indicating the vide program data to be routed to said cherrypicker multiplexer and routing incoming local area network packets containing data specified by specified by a cherrypicker multiplexer as desired data to said cherrypicker multiplexer;

(6) in each cherrypicker multiplexer, sorting incoming MPEG packets by their PIDs into one or more MPEG transport streams to be transmitted to one or more customers and packetizing each MPEG transport stream into TCP/IP or UDP/IP packets.

20. The process of claim 19 wherein step (5) includes at least receiving at said packet switch cherrypicker multiplexer one or more local area network packets containing data indicating video-on-demand program data which has been requested by one or more customers being served by said cherrypicker multiplexer, and wherein step (6) further comprises packetizing MPEG packets from each MPEG transport stream encoding a video-on-demand program which has been requested by a customer in TCP/IP or UDP/IP packets addressed to a host computer and a particular process executing on said host computer which requested said video-on-demand program.

21. The process of claim 20 wherein step (6) further comprises the steps of:

receiving data indicating the available bandwidth for MPEG packet encoding particular video programs;

decompressing at least partially the MPEG packets received in each cherrypicker multiplexer;

recompressing the video data from MPEG packets encoding each particular video program to the available bandwidth specified for that particular video program; and repacketizing the video data into MPEG packets in an MPEG transport stream.

22. The process of claim 19 wherein step (5) includes at least receiving from each cherrypicker multiplexer one or more local area network packets containing data indicating video program data which has been requested by one or more customers being served by said cherrypicker multiplexer, and wherein step (6) further comprises packetizing MPEG packets from each MPEG transport stream encoding a video-on-demand program which has been requested by a customer in TCP/IP or UDP/IP packets addressed to an MPEG transport stream generating process in one of one or more IP dewrapper circuits which transmits MPEG transport streams to customers, the particular IP dewrapper circuit to which said TCP/IP or UDP/IP packets encoding a particular video-on-demand program are addressed being the one which transmits an MPEG transport stream to a customer which requested said video-on-demand program, and further comprising the step of encapsulating packets dewrapper circuit.

23. The process of claim 22 further comprising stripping off the local area network packet headers and TCP/IP or UDP/IP packet headers from said local area network packets encapsulating the MPEG packets which encode a particular video-on-demand program and transmitting said MPEG packets to the customer which requested said video-on-demand program as an MPEG transport stream which is modulated in any way and multiplexed, if necessary, in any way onto any suitable downstream logical and physical channel.

24. The process of claim 23 wherein step (6) further comprises the steps of:

receiving data indicating the available bandwidth for MPEG packet encoding particular video programs;

decompressing at east partially the MPEG packets received in each cherrypicker multiplexer;

recompressing the video data from MPEG packets encoding each particular video program to the available bandwidth specified for that particular video program; and repacketizing the video data into MPEG packets in an MPEG transport stream.

25. The process of claim 22 wherein step (6) further comprises the steps of:

receiving data indicating the available bandwidth for MPEG packet encoding particular video programs;

decompressing at least partially the MPEG packets received in each cherrypicker multiplexer;

recompressing the video data from MPEG packets encoding each particular video program to the available bandwidth specified for that particular video program; and repacketizing the video data into MPEG packets in an MPEG transport steam.

26. The process of claim 19 wherein step (6) further comprises the steps of:

receiving data indicating the available bandwidth for MPEG packets encoding particular video programs;

decompressing at least partially the MPEG packets received in each cherrypicker multiplexer;

recompressing the video data from MPEG packets encoding each particular video program to the available bandwidth specified for that particular video program; and repacketizing the video data into MPEG packets in an MPEG transport stream.

27. A process for supplying video data to consumers, comprising the steps of:

(1) receiving one or more MPEG transport streams containing data encoding video programs to be transmitted to one or more consumers, each MPEG transport stream comprised of a plurality of MPEG packets each having a program identification code (hereafter PID);
(2) encapsulating one or more MPEG packets having the same PID and input multiplex number (together hereafter referred to as a combined PID) from said transport streams in the payload portion of an internet protocol packet (hereafter referred to as an IP packet) and mapping the combined PID of the encapsulated MPEG packets into an IP multicast address used as the destination address of said IP packet;
(3) encapsulating each said IP packet in a local area network packet and mapping said IP packet multicast destination address into a multicast destination address for the local area network destination address which is unique for each combined PID;
(4) transmitting said local area network packets so generated over said local area network to a packet switch;
(5) receiving in said packet switch from each of said one or more cherrypicker multiplexers one or more local area network packets containing data indicating the video-on-demand program data which has been requested by one or more customers and which is to be routed to said cherrypicker multiplexer and routing incoming local area network packets containing data specified by a cherrypicker multiplexer as desired data to said cherrypicker multiplexer;
(6) in each cherrypicker multiplexer, sorting incoming MPEG packets by their combined PIDs into one or more MPEG transport streams to be transmitted to one or more customers and further comprising the steps of packetizing MPEG packets from each MPEG transport stream encoding a video-on-demand program which has been requested by a customer in TCP/IP or UDP/IP packets addressed to an MPEG transport stream generating process in one of one or more IP dewrapper circuits which transmit MPEG transport streams to customers, the particular IP dewrapper circuit to which said TCP/IP or UDP/IP packets encoding a particular video-on-demand program are addressed being the one which transmits an MPEG transport stream to a customer which requested said video-on-demand program, and further comprising the step of encapsulating said TCP/IP or UDP/IP packets in a local area network packet addressed to said IP dewrapper circuit;
(7) stripping off the local area network packet headers and TCP/IP or UDP/IP packet headers from said local area network packets encapsulating the MPEG packets which encode a particular video-on-demand program and transmitting said MPEG packets to the customer which requested said video-on-demand program as an MPEG transport stream which is modulated in any way and multiplexed, if necessary, in any way onto any suitable downstream logical and physical channel;
(8) and wherein step (6) further comprises the steps of:
receiving data indicating the available bandwidth for MPEG packet encoding particular video programs;
decompressing at least partially the MPEG packets received in each cherrypicker multiplexer;
recompressing the video data from MPEG packets encoding each particular video program to the available bandwidth specified for that particular video program; and
repacketizing the video data into MPEG packets in an MPEG transport stream.

28. A process carried out at a headend having video servers coupled thereto for supplying video data from video servers coupled to said headend and iData to consumers, wherein iData is defined as data from one or more web or other servers coupled to said headend other than said video servers coupled to said headend, comprising the steps of:
(1) in a modem coupled to one or more customers by any upstream and downstream data paths, receiving upstream video-on-demand requests and requests for iData and iData command packets, packetizing said requests and commands into local area network packets (hereafter LAN packets) and transmitting LAN packets containing requests for iData and other commands via a local area network to an appropriate server entity which can supply the requested iData or execute the iData command, and transmitting LAN packets containing video-on-demand requests to one or more cherrypicker multiplexers;
(2) simultaneously or at different times, receiving in an IP dewrapper circuit one or more MPEG transport streams containing data encoding video programs to be transmitted to one or more consumers, each MPEG transport stream comprised of a plurality of MPEG packets each having a program identification code (hereafter PID);
(3) receiving or generating in a web server connected to the internet or any other type of server including an application server one or more TCP/IP or UDP/IP packets of iData and encapsulating them in local area network packets addressed to a modem which will be used to transmit the TCP/IP or UDP/IP packets encapsulated in said LAN packets downstream and transmitting said LAN packets to a packet switch;
(4) in said packet switch routing said LAN packets containing iData to said modem;
(5) in said modem, receiving said LAN packets containing iData and transmitting them downstream to the customer which requested said iData;
(6) in an IP wrapper circuit, encapsulating one or more MPEG packets of video program data having the same PID and input multiplex number (together hereafter referred to as a combined PID) from said transport streams in the payload portion of an internet protocol packet (hereafter referred to as an IP packet) and mapping the said combined PID of the encapsulated MPEG packets into an IP multicast address used as the destination address of said IP packet;
(7) in said IP wrapper circuit encapsulating each said IP packet in a LAN packet and mapping said IP packet multicast destination address into a multicast destination address for the local area network destination address which is unique for each said combined PID;
(8) transmitting said LAN packets so generated containing video program data over said local area network to a packet switch;
(9) receiving in said packet switch from each of said one or more cherrypicker multiplexers one or more LAN packets containing data indicating the video program data to be routed to said cherrypicker multiplexer and routing incoming LAN packets containing data specified by a cherrypicker multiplexer as desired data to said cherrypicker multiplexer;
(10) in each cherrypicker multiplexer, receiving data indicating video-on-demand requests for video programs and transmitting data to said packet switch indicating which LAN packets containing video program data to route to said cherrypicker multiplexer, and sorting incoming MPEG packets by their combined PIDs into one or more MPEG transport streams to be transmitted to one or more customers and performing the following steps:

decompressing at least partially the MPEG packets received in each cherrypicker multiplexer;

recompressing the video data from MPEG packets encoding each particular video program to the available bandwidth specified for that particular video program; and repacketizing the video data into MPEG packets and packetizing said MPEG packets in TCP/IP or UDP/IP packets.

29. The process of claim 28 wherein said TCP/IP or UDP/IP packets generated by said cherrypicker multiplexer are addressed to a host computer and process executing on said host computer at a customer location to which the data encapsulated in said TCP/IP or UDP/IP packets is to be sent, and further comprising the step of transmitting said TCP/IP or UDP/IP packets to said host computer and process executing on said host over any downstream logical channel which has TCP/IP or UDP/IP connectivity all the way to said host computer and process running on said host computer.

30. The process of claim 28 wherein said TCP/IP or UDP/IP packets generated by said cherrypicker multiplexer are addressed to an IP dewrapper circuit, and further comprising the steps of:

encapsulating said TCP/IP or UDP/IP packets in local area network packets addressed to said IP dewrapper circuit;

in said IP dewrapper circuit, receiving said LAN packets and stripping off the LAN packet headers and TCP/IP or UDP/IP packet headers and assembling the encapsulated MPEG packets into MPEG transport streams;

transmitting said MPEG transport streams to specific customers over logical channels on any suitable downstream medium; and if said MPEG video data contains video-on-demand video program data for which a host computer and a process executing on said host computer at the customer location which requested the video program does not have data regarding which logical channel said requested video program data will be transmitted on and/or what PID the video program data will have, transmitting a downstream message to said host computer and said process executing on said host computer which requested said video program data indicating which logical channel said video program will be transmitted on and, if necessary, what PID or PIDs said requested video program data will have.

31. A process video carried out at a headend having video servers coupled thereto, said process for supplying video data to consumers, comprising the steps of:

(1) in a modem coupled to one or more customers by any upstream and downstream data paths, receiving upstream video-on-demand requests and requests for iDatas, wherein iData is defined as data from one or more web or other servers coupled to said headend other than said video servers coupled to said headend; packetizing said requests into local area network packets (hereafter LAN packets) and transmitting LAN packets containing each request for iData via a local area network to an appropriate server entity which can supply the requested iData along with message data indicating to which of one or more cherrypicker multiplexers to transmit the requested iData, and transmitting LAN packets containing video-on-demand requests to one or more cherrypicker multiplexers;

(2) receiving in an IP dewrapper circuit one or more MPEG transport streams containing data encoding video programs to be transmitted to one or more consumers, each MPEG transport stream comprised of a plurality of MPEG packets each having a program identification code (hereafter PID);

(3) receiving or generating in web server connected to the internet or any other type of server including an application server one or more TCP/IP or UDP/IP packets of iData and encapsulating them in network packets (hereafter network packets) addressed to one or more cherrypicker multiplexers at least one of which will be used to transmit said iData packets downstream in an MPEG transport stream, and transmitting said network packets to a packet switch;

(4) in said packet switch, routing said network packets containing iData to a cherrypicker multiplexer;

(5) in each said cherrypicker multiplexer, receiving said network packets containing iData and recovering iData stored therein;

(6) in an IP wrapper circuit, encapsulating one or more MPEG packets of video program data having the same PID and input multiplex number (together hereafter referred to as a combined PID) from said transport streams in the payload portion of an internet protocol packet (hereafter referred to as an IP packet) and mapping the combined PID of the encapsulated MPEG packets into an IP multicast address used as a destination address of said IP packet;

(7) in said IP wrapper circuit, encapsulating each said IP packet in a LAN packet and mapping said IP packet multicast destination address into a local area network destination address which is unique for each said combined PID and placing said local area network destination address in said LAN packet;

(8) transmitting said LAN packets so generated containing video program data over said local area network to a packet switch;

(9) receiving in said packet switch from each of said one or more cherrypicker multiplexers one or more LAN packets containing data indicating which LAN packets containing said video program data or iData are to be routed to said cherrypicker multiplexer and routing incoming LAN packets containing the specified data to said cherrypicker multiplexer;

(10) in each cherrypicker multiplexer, receiving VOD request data indicating video-on-demand requests for video programs made by customers and transmitting LAN packets containing said VOD request data to said packet switch indicating which LAN packets containing video-on-demand program data to route to said cherrypicker multiplexer, and sorting incoming LAN packets arriving from said packet switch and containing MPEG packets containing video data by a PID in each MPEG packet or by local area network station addresses in said incoming LAN packets, each of said local are network station addresses being mapped to a PID in an MPEG packet encapsulated in said LAN packet, said sorting resulting in one or more pluralities of LAN packets containing MPEG packet data from which one or more MPEG transport streams to be transmitted to one or more customers can be created, and performing the following steps:

recovering MPEG packets encapsulated in said LAN packets and decompressing at least partially the MPEG packets received in each cherrypicker multiplexer;

recompressing the data from MPEG packets encoding each particular video program and iData to the available bandwidth specified for that particular video program or iData; and repacketizing the video data and iData into MPEG packets and packetizing said MPEG packets in TCP/IP or UDP/IP packets.

32. The process of claim 31 wherein said TCP/IP or UDP/IP packets generated by each said cherrypicker multiplexer are addressed to a host computer and process executing on said host computer at a customer location to which the video data or iData encapsulated in said TCP/IP or UDP/IP packets is to be sent, and further comprising the step of transmitting said TCP/IP or UDP/IP packets to said host computer and process running on said host computer over any downstream logical channel which has TCP/IP or UDP/IP connectivity all the way to said host computer and process running on said host computer.

33. The process of claim 31 wherein said TCP/IP or UDP/IP packets generated by said cherrypicker multiplexer are addressed to an IP dewrapper circuit, and further comprising the steps of:

encapsulating said TCP/IP or UDP/IP packets in LAN packets addressed to said IP dewrapper circuit;

in said IP dewrapper circuit, receiving said LAN packets and stripping off the LAN packet headers and TCP/IP or UDP/IP packet headers and assembling the encapsulated MPEG packets into MPEG transport streams;

transmitting said MPEG transport streams to specific customers over logical channels on any suitable downstream medium; and if said MPEG video data contains video-on-demand video program data for which the host and process at the customer location which requested the video program does not have data regarding which logical channel said requested video program data will be transmitted on and/or what PID the video program data will have, transmitting a downstream message to a host computer and a process running on said host computer which requested said video program data indicating which logical channel said video program will be transmitted on and, if necessary, what PID or PIDs said requested video program data will have.

34. A process carried out at a headend having video servers coupled thereto, said process for supplying video data to consumers, comprising the steps for:

(1) in a modem coupled to one or more customers by any upstream, receiving upstream video-on-demand requests and requests for iData and iData commands wherein iData is defined as data from one or more web or other servers other than said video servers coupled to said headend, and transmitting them to a control computer;

(2) in said control computer transmitting one or more messages to one or more video servers, web servers and/or application servers that can supply the requested data requesting that they supply the requested data and assigning logical channels on which the requested iData and video program data is to be transmitted to the customer and generating downstream messages to be sent to each customer telling the customer which logical channel upon which the data said customer requested will be found;

(3) transmitting the requested iData and video program data and downstream message data to one or more cherrypicker multiplexers; and (4) in each cherrypicker multiplexer, adjusting the bandwidth of the video data and/or the iData if necessary and repacketizing said video data and iData and downstream message data in MPEG packets and transmitting said MPEG packets to the customer who requested the data via an MPEG transport stream.

35. A process carried out in a headend coupled to one or more video servers, said process for supplying video data and iData to consumers, wherein iData is defined as data from one or more web or other servers other than said video servers coupled to said headend, comprising the steps of:

(1) in a modem coupled to one or more customers by any upstream, data path and any downstream data path compatible with said modem, receiving upstream video-on-demand requests and requests for iData and iData commands and transmitting them to a control computer, and receiving downstream iData and downstream command and control messages, both said downstream iData and said command and control messages encapsulated in TCP/IP or UDP/IP packets addressed to a host computer and one or more processes running on said host computer at a customer at a customer location, and transmitting said downstream iData and command and control messages to said customer to which it is addressed over said downstream data path;

(2) in said control computer transmitting one or more messages to one or more video servers, web servers and/or application servers that can supply the requested video data and iData requesting that they supply the requested video data and iData and assigning logical channels on which the requested video program data is to be transmitted to the customer and generating downstream command and control messages to be sent to each customer telling the customer which logical channel upon which the video-on-demand data said customer requested will be found;

(3) transmitting the requested video program data to one or more cherrypicker multiplexers; and (4) in each cherrypicker multiplexer, adjusting the bandwidth of the video data of each video program if necessary to a smaller bandwidth and repacketizing said video data in MPEG packets and transmitting said MPEG packets to the customer who requested the data via an MPEG transport stream.

36. The process of claim 35 wherein said modem is a Data Over Cable Service Interface Specifications (hereafter DOCSIS) compliant cable modem and said upstream and downstream data paths are hybrid fiber coaxial cable plants.

37. The process of claim 35 wherein said modem is one or more digital subscriber line modems, and said upstream and downstream data paths are digital subscriber lines.

38. The process of claim 35 wherein said modem is comprised of a conventional telephone line modem receiver for receiving upstream data and commands from a customer and a downstream circuit for delivery of data and commands downstream to a customer using a satellite transmitting to a satellite antenna and satellite receiver at a customer premises where said satellite antenna and satellite receiver at the customer premises are not part of the invention, said downstream circuit of said modem comprising a satellite uplink transmitter and a satellite transponder for transmitting said downstream data to a satellite for transmission downstream to said customer via satellite transponder, and wherein said upstream data path is a conventional POTS telephone line.

39. A process carried out in a headend coupled to one or more video servers, said process for supplying video data to consumers, comprising the steps of:

(1) in a modem coupled to one or more customers by any upstream and any downstream data path, receiving upstream video-on-demand requests and requests for iData and iData commands and transmitting them to a control computer wherein iData is defined as data from one or more web or other servers other than said video servers coupled to said headend, and receiving downstream command and control messages from said control computer and transmitting them to customers over said downstream data path via said modem;

(2) in said control computer transmitting one or more messages to one or more video servers, web servers and/or application servers that can supply the requested data requesting that they supply the requested video data and iData and assigning logical channels on which the requested iData and video program data is to be transmitted to the customer and generating downstream command and control messages to be sent to each customer telling the customer which logical channel upon which the iData and video program data said customer requested will be found;

(3) transmitting the requested iData and video program data to one or more cherrypicker multiplexers; and (4) in each cherrypicker multiplexer, adjusting the bandwidth of the video data and/or the iData, if necessary, to a smaller bandwidth, and repacketizing said video data and iData in MPEG packets and transmitting said MPEG packets to the one or more customer who requested the data via one or more logical channels as one or more MPEG transport streams.

40. The process of claim 39 wherein said modem is a Data Over Cable Service Interface Specifications (hereafter DOCSIS) compliant cable modem and said upstream and downstream data paths are hybrid fiber coaxial cable plants.

41. The process of claim 39 wherein said modem is one or more digital subscriber line modems, and said upstream and downstream data paths are digital subscriber lines.

42. The process of claim 39 wherein said modem is comprised of a conventional telephone line modem receiver for receiving upstream data and commands from a customer and a downstream circuit for delivery of data and commands downstream to a customer using a satellite transmitting to a satellite antenna and satellite receiver at a customer premises where said satellite antenna and satellite receiver at the customer premises are not part of the invention, said downstream circuit of said modem comprising a satellite uplink transmitter and a satellite transponder for transmitting said downstream data to a satellite for transmission downstream to said customer via said satellite transponder, and wherein said upstream data path is a conventional POTS telephone line.

* * * * *